United States Patent [19]
Yamanaka et al.

[11] Patent Number: 6,000,460
[45] Date of Patent: Dec. 14, 1999

[54] HEAT EXCHANGER FOR VEHICLE

[75] Inventors: Yasutoshi Yamanaka, Kariya; Tatsuo Sugimoto, Okazaki; Takaaki Sakane, Nagoya, all of Japan

[73] Assignee: Denso Corporation, Kariya, Japan

[21] Appl. No.: 08/955,839

[22] Filed: Oct. 21, 1997

[30] Foreign Application Priority Data

Oct. 22, 1996 [JP] Japan .................................. 8-279550
Nov. 12, 1996 [JP] Japan .................................. 8-300345

[51] Int. Cl.$^6$ ........................................................ F28F 9/00
[52] U.S. Cl. .......................... 165/67; 165/81; 165/140; 165/135
[58] Field of Search ............................... 165/67, 81, 140, 165/149; 180/68.4

[56] References Cited

U.S. PATENT DOCUMENTS

| | | | |
|---|---|---|---|
| 4,579,184 | 4/1986 | Hiramoto | 180/68.4 |
| 5,000,257 | 3/1991 | Shinmura | 165/140 |
| 5,566,748 | 10/1996 | Christensen | 165/67 |

FOREIGN PATENT DOCUMENTS

| | | | |
|---|---|---|---|
| 408752 | 4/1910 | France | 180/68.4 |
| 4028250 | 10/1991 | Germany | 180/68.4 |
| A-3-177795 | 8/1991 | Japan . | |
| A-6-159975 | 6/1994 | Japan . | |
| 7-41276 U | 7/1995 | Japan . | |
| 1207820 | 1/1986 | U.S.S.R. | 180/68.4 |
| 1379140 | 3/1988 | U.S.S.R. | 180/68.4 |

*Primary Examiner*—Allen Flanigan
*Attorney, Agent, or Firm*—Harness, Dickey & Pierce, PLC

[57] ABSTRACT

According to the present invention, a pin-disposed portion where a pin member for mounting a heat exchanger on a vehicle is disposed is structured such that an inner edge shape of a cross section of the pin-disposed portion draws a four-sided closed curved line. The pin member passes through an inner space of the pin-disposed portion and is connected to the pin-disposed portion at plural positions. In this way, the pin-disposed portion constructs a shell structure which is superior in a mechanical strength. Further, because the pin member is connected to the pin-disposed portion at plural positions while passing through the space, the shell structure of the pin-disposed portion can be made more rigid.

23 Claims, 16 Drawing Sheets

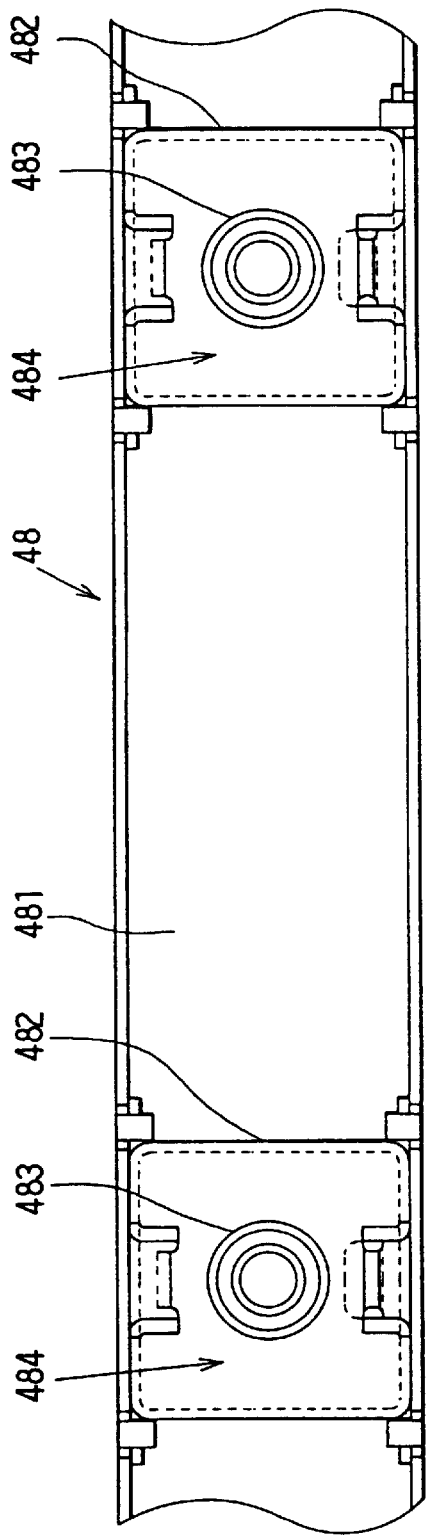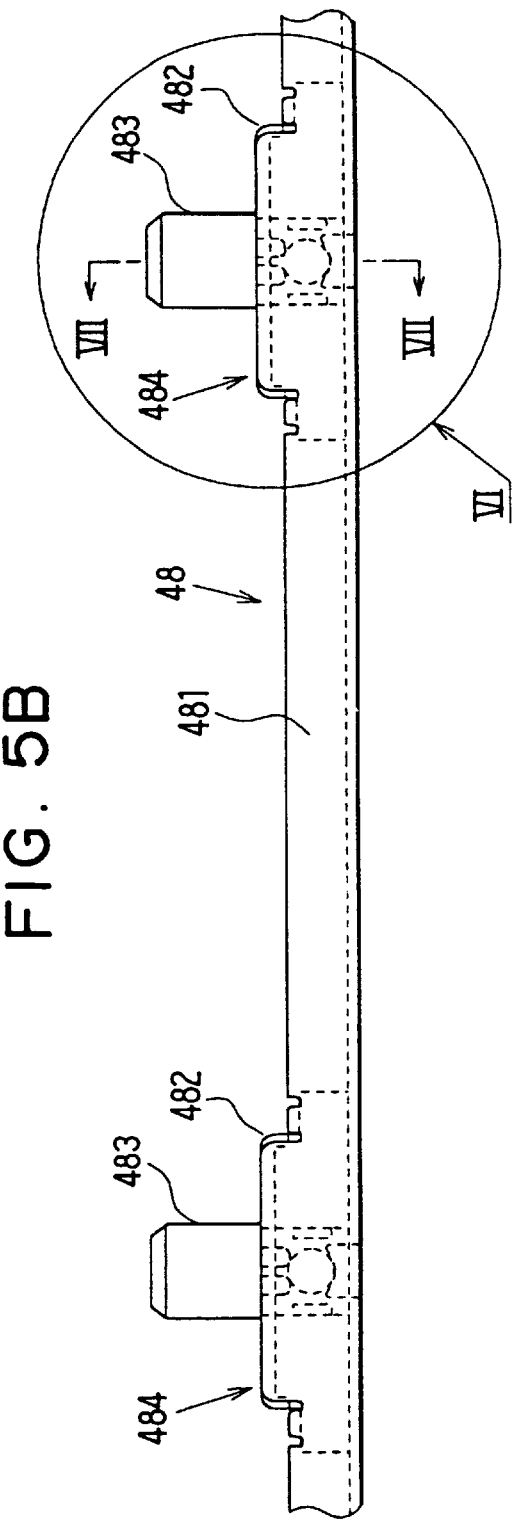

LENGTH Lr OF ADDITIONAL FIN

CONNECTION RATIO

HEAT EXCHANGER FOR VEHICLE

CROSS-REFERENCE TO RELATED APPLICATIONS

This application is based on and claims priority of Japanese Patent Applications of Nos. Hei. 8-279550 filed on Oct. 22, 1996, and Hei. 8-300345 filed on Nov. 12, 1996, the contents of which are incorporated herein by reference.

BACKGROUND OF THE INVENTION

1. Field of the Invention

The present invention relates to a heat exchanger for a vehicle, in which a pin member for mounting the heat exchanger on the vehicle is integrally connected to the heat exchanger, and is effectively employed for a heat exchanger having a comparatively large mass, such as a radiator or a condenser.

2. Description of Related Art

The heat exchanger for a vehicle is assembled into the vehicle by a pin member integrally connected to the heat exchanger, as described above. For example, in JP-A-6-159975, one axial end portion of a pin member is joined to a bracket formed in a U-shaped cross section, and the bracket is fastened onto a side plate for reinforcing a core portion of the radiator by a bolt.

In recent years, to expand the space in a passenger compartment of the vehicle while suppressing the vehicle from being large-sized, the industry has increased the production of a front engine front drive vehicle (so-called FF vehicle). In general, in the FF vehicle, an engine vibration is reduced by vibrating the heat exchanger for a vehicle as a balance weight with a resonance frequency according to a vibration frequency of the engine.

Therefore, a large vibrating force is applied to a pin member and the portion where the pin member is received (pin-receiving portion). Because the vibrating force is partially applied to the pin-receiving portion with the pin member as a center, the pin-receiving portion especially needs high mechanical strength.

Against this necessity, in JP-A-6-159975, because the axial one end of the pin member is joined only to the bracket formed in a U-shaped cross section, the bracket may be partially deformed by a concentrated load generated by the pin member, so that it is difficult to obtain a sufficient mechanical strength with this structure.

The problem of the mechanical strength of the pin-receiving portion is described with reference to the FF vehicle; however, the problem of the mechanical strength of the pin-receiving portion is also caused in a front engine rear drive vehicle (so-called FR vehicle), because a vibrating force is applied to the heat exchanger for a vehicle by an engine vibration or the like.

SUMMARY OF THE INVENTION

The present invention has been accomplished in view of the above-mentioned problem, and an object of the present invention is to provide a structure having a sufficient mechanical strength against a partial concentrated load applying to a pin member as a center.

According to the present invention, a pin-receiving portion where a pin member for mounting a heat exchanger on a vehicle is received is structured such that a closed cross-sectional space is formed. The pin member passes through the inner space of the pin-receiving portion and is connected to the pin-receiving portion at plural positions. In this way, the pin-receiving portion constructs a shell structure which is superior in mechanical strength. Further, because the pin member is connected to the pin-receiving portion at plural positions while passing through the space, the shell structure of the pin-receiving portion can be made more rigid. Therefore, even if a partial concentrated load acting with the pin member as a center is applied to the pin-receiving portion, the pin-receiving portion can maintain a sufficient mechanical strength.

BRIEF DESCRIPTION OF THE DRAWINGS

Additional objects and advantages of the present invention will be more readily apparent from the following detailed description of preferred embodiments thereof when taken together with the accompanying drawings in which:

FIG. 5A is a top view of a bracket, and

FIG. 5B is a front view of the bracket;

DETAILED DESCRIPTION OF THE PREFERRED EMBODIMENTS

Embodiments according to the present invention will be described hereinafter with reference to the drawings.

A first embodiment of the present invention will be described.

In this embodiment, the present invention is employed for a heat exchanger for a vehicle (hereinafter referred to as heat exchanger) in which a core portion of a radiator for cooling cooling water of a water cooled engine (see FIG. 10) and a core portion of a condenser for condensing (radiating) refrigerant circulating in a refrigeration cycle are integrated. A temperature of the refrigerant is lower than that of the cooling water; and therefore, the core portion of the condenser is generally disposed at an air upstream side of the core portion of the radiator.

Figure 1:
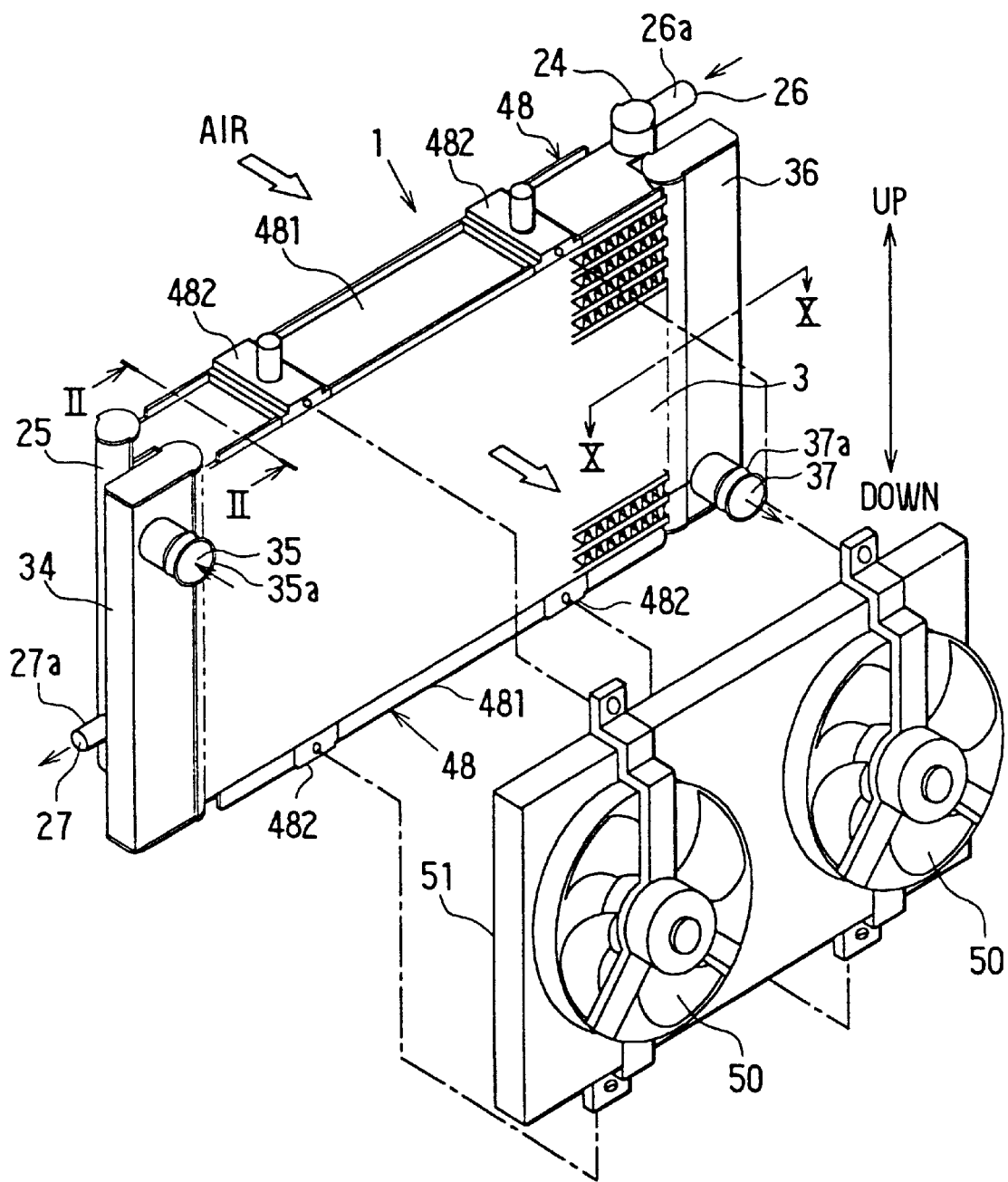
FIG. 1 is a perspective view of a heat exchanger according to a first embodiment of the present invention.
Figure 2:
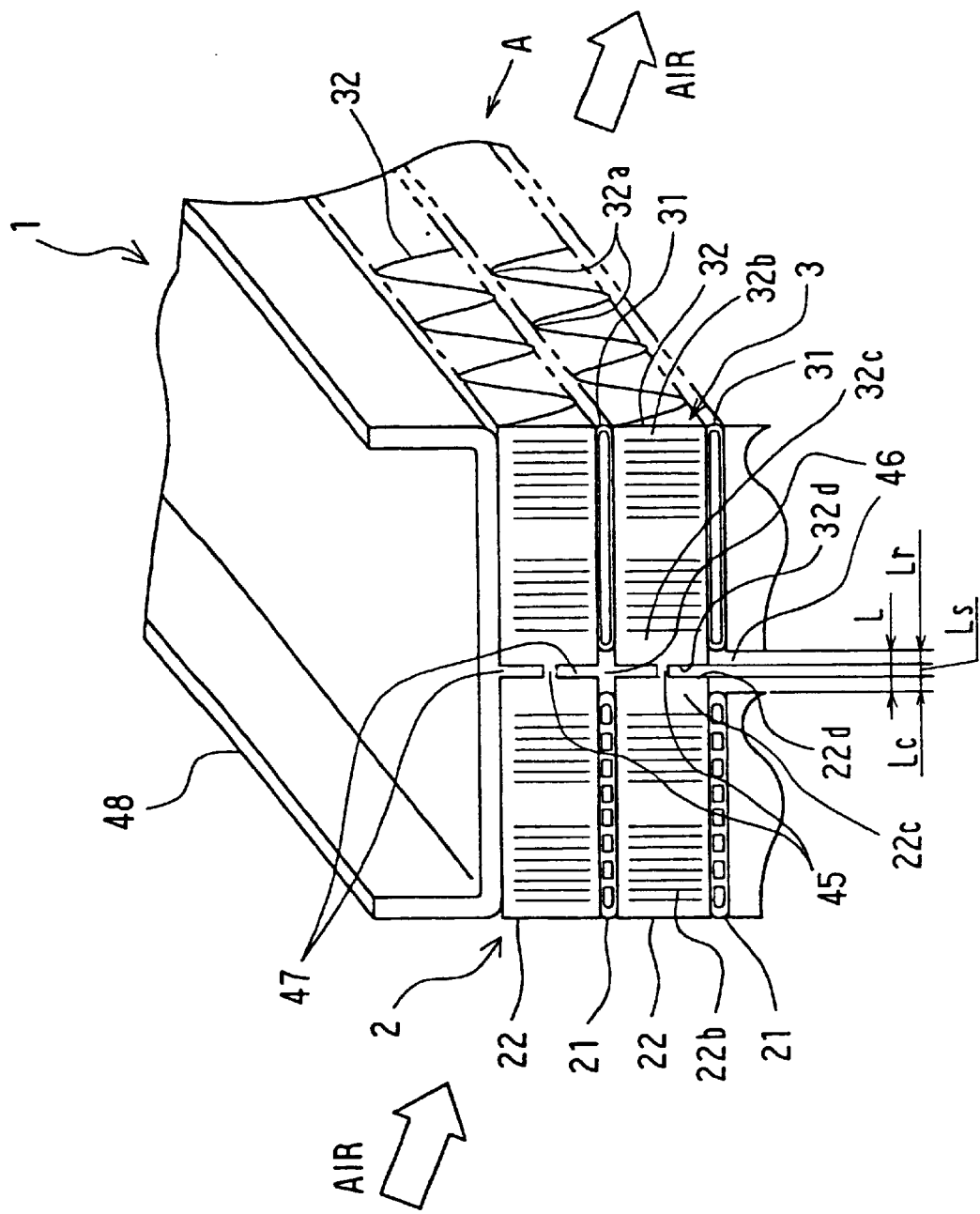
FIG. 2 is a cross sectional view taken along the line II—II of FIG. 1.

FIG. 1 is a perspective view of the heat exchanger 1 of this embodiment, and FIG. 2 is a cross sectional view taken along the line II—II of FIG. 1. The numeral 2 indicates a condenser core portion 2, and the numeral 3 indicates a radiator core portion. Both core portions 2 and 3 are disposed between both tubes 21 and 31 in series with reference to an air flow direction to form a predetermined gap therebetween, for insulating heat conductivity from each other.

In FIG. 1, the numeral 50 indicates a blower disposed at an air downstream side of the radiator core portion 3 to draw air toward both core portions 2 and 3, the numeral 51 indicates a fan shroud (holding member) made of resin, for holding the blower 50 and for improving the air drawing efficiency by preventing air from being sucked from between the blower 50 and the radiator core portion 3.

The condenser core portion 2 includes a condenser tube 21 for forming a flat passage for refrigerant and a corrugated (wavy) cooling fin 22 brazed to the condenser tube 21, in which a plurality of folded portions 22a (see FIG. 3) is formed.

The radiator core portion 3 has a structure similar to that of the condenser core portion 2, and includes a radiator tube 31 disposed in parallel with the condenser tube 21, and a cooling fin 32. Tubes 21 and 31 and the cooling fins 22 and 32 are alternately laminated and brazed to each other. In the cooling fins 22 and 32, there are formed louvers 22b and 32b for facilitating heat-exchange. Both cooling fins 22 and 32 are formed integrally with louvers 22b and 32b by a roller forming method or the like.

Figure 3:
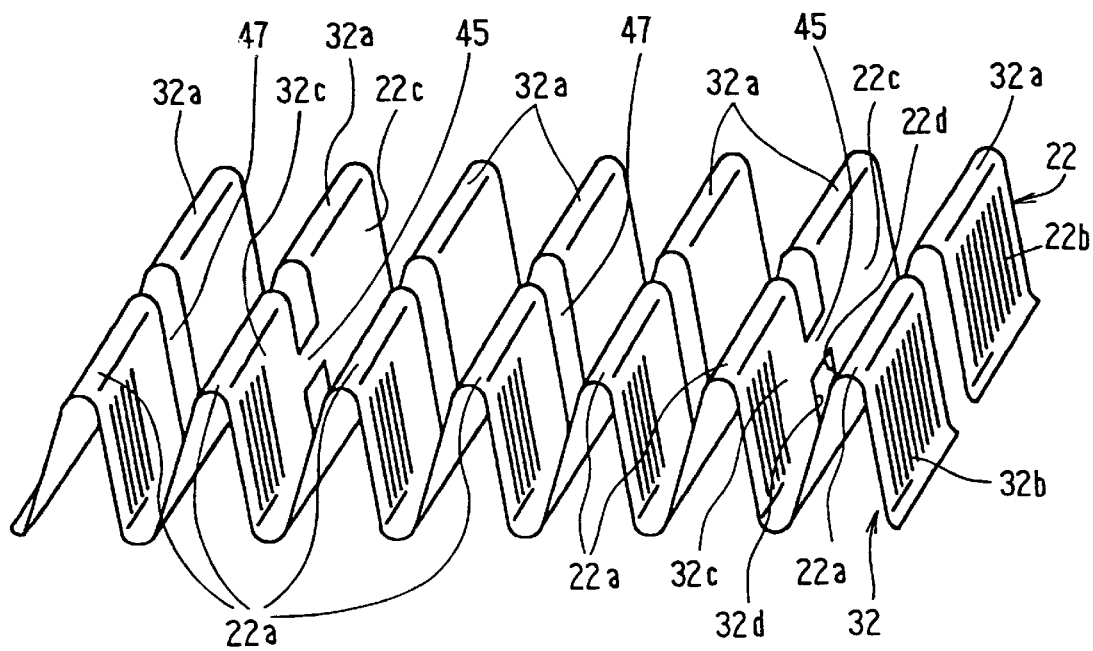
FIG. 3 is a perspective view showing a shape of a cooling fin.

At end portions 22d and 32d of end portions 22 and 32, which face each other in a direction perpendicular to a longitudinal direction, there are a plurality of connecting portions 45 for connecting both cooling fins 22 and 32. Between connecting portions 45, as shown in FIG. 3, there are formed a plurality of folded portions 22a and 32a (5 to 10 portions in this embodiment).

Figure 4:
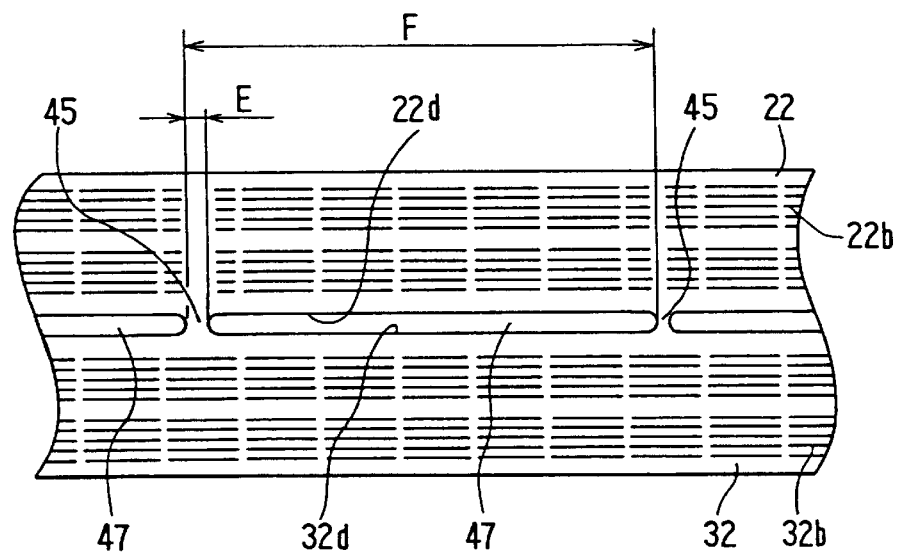
FIG. 4 is an exploded view of the cooling fin.

Both cooling fins 22 and 32 are shown flat in FIG. 4. In this embodiment, a size E of a portion of the connecting portion 45, which is in parallel with the longitudinal direction of both cooling fins 22 and 32, is equal to or less than 5% of a size F between adjacent connecting portions 45.

Because the folded portions 22a and 32a of both cooling fins 22 and 32 contact both tubes 21 and 31, the heat conduction through the folded portions 22a and 32a are the largest value. Therefore, as shown in FIGS. 2 and 3, it is preferable that the connecting portion 45 is formed on flat surface portions 22c and 23c of both cooling fins 22 and 32.

Sizes of widths in a longitudinal direction which is perpendicular to the direction of both tubes 21 and 31 of both cooling fins 22 and 32 are larger than those of flat widths of both tubes 21 and 31, and as shown in FIG. 2, both cooling fins 22 and 32 protrude toward the gap 46 (with a protrusion length Lc and a protrusion length Lr). The protrusion length Lc and the protrusion length Lr will be described later.

Further, as shown in FIG. 1, out of end portions of the radiator core portion 3, at one end portion where a bracket (described later) is not disposed, there is disposed a first radiator tank 34 for distributing cooling water into each radiator tube 31, and at the other end portion, there is provided a second radiator tank 36 for collecting cooling water having heat-exchanged. At an upper end side of the first radiator tank 34, there is provided an inflow port 35 through which the cooling water from the water cooled engine flows into the first radiator tank 34. On the other hand, at a lower side of the second radiator tank 36, there is provided an outflow port 37 through which the cooling water flows out toward the water cooled engine. Joint pipes 35a and 37a are for connecting outside pipes (not shown) to both radiator tanks 34 and 36. Joint pipes 35a and 37a are joined to the radiator tanks 34 and 36, respectively, by brazing.

A first condenser tank 24 is for distributing refrigerant of the condenser core portion 2 to each condenser tube 21, and a second condenser tank 25 of the condenser core portion 2 is for collecting the refrigerant having heat-exchanged (been condensed). Further, there are provided an inflow port 26 through which the refrigerant discharged from a compressor (not shown) of the refrigeration cycle into the first condenser tank 24, and an outflow port 27 through which the refrigerant having heat-exchanged (been condensed) flows toward an expansion valve (not shown) of the refrigeration cycle.

Joint pipes 26a and 27a are for connecting outside pipes (not shown) to both condenser tanks 24 and 25. Joint pipes 26a and 27a are joined to the condenser tanks 24 and 25, respectively, by brazing.

Figure 6:
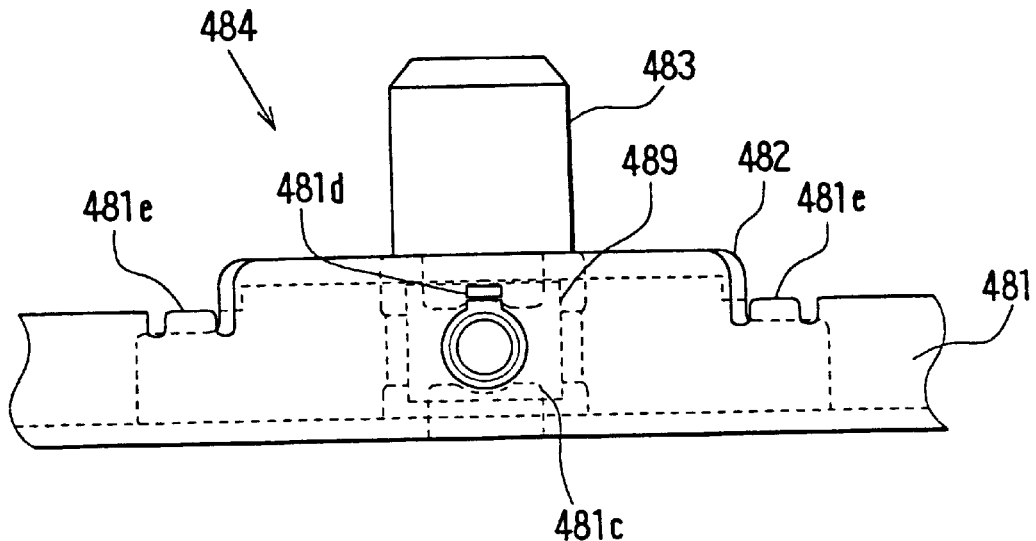
FIG. 6 is an enlarged view of the portion VI of FIG. 5B.

Brackets 48 are disposed at each side of both core portions 2 and 3 to assemble both core portions 2 and 3 into the vehicle. The bracket 48 is, as shown in FIGS. 1, 5, and 6, formed of a side plate 481 disposed a side of the core portion 2 or 3, sub plates 482 connected to the main plate 481, and pin members 483 each made of a pipe material, to be assembled into the vehicle. The pin member 483 is disposed in a pin-receiving portion 484 formed by the main plate 481 and the sub plate 482, while protruding in a direction perpendicular to a longitudinal direction of the bracket 48 and an air flow direction.

Figure 7:
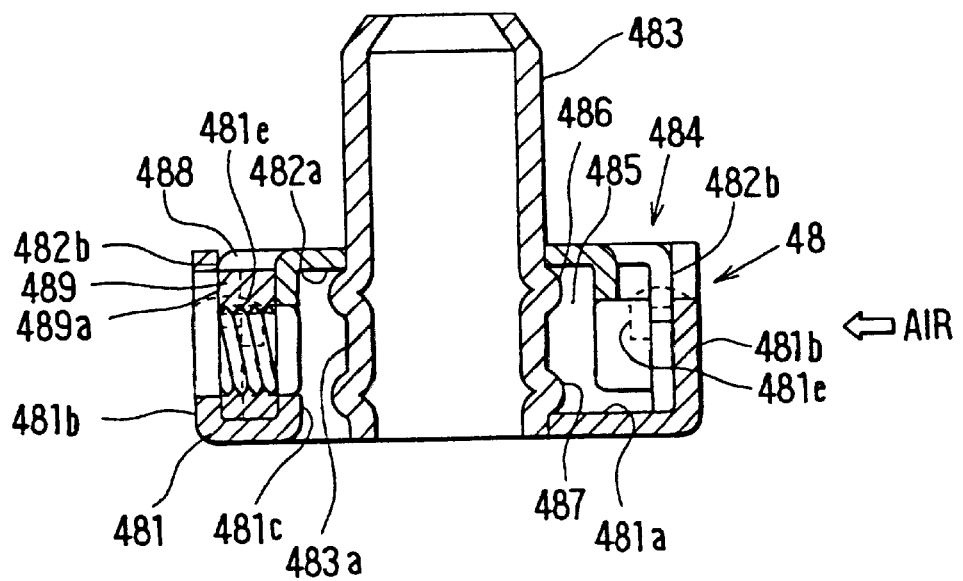
FIG. 7 is a cross sectional view taken along the line VII—VII.

The pin-receiving portion 484 is constructed, as shown in FIG. 7, by both plates 481 and 482 each having a U-shape, such that the pin-receiving portion 484 forms a closed cross-sectional space, generally rectangular, as viewed from the longitudinal direction of the bracket 48. The pin member 483 is connected to bottom portions 481a and 482a of both plates 481 and 482 each having a U-shape and passing through the space 485.

Further, out of a cylindrical outer wall surface 483a in parallel with an axial direction of the pin member 483, at a portion inside the space 485, there are formed a main protrusion portion 486 which protrudes from the cylindrical outer wall surface 483a in a direction perpendicular to the axial direction of the pin member 483 and contacts the sub plate 482 and a sub protrusion portion 487 which contacts the main plate 481. Both protrusions 486 and 487 are integrally formed with the pin member 483 over an entire periphery of the cylindrical outer wall surface 483a.

Located in gaps 488 between side wall portions 481b and 482b of both plates 481 and 482 at an air downstream side, as shown in FIGS. 6 and 7, there is disposed a nut (connecting portion) 489 for connecting the fan shroud 51 by a bolt (see FIG. 1).

Figure 8A:
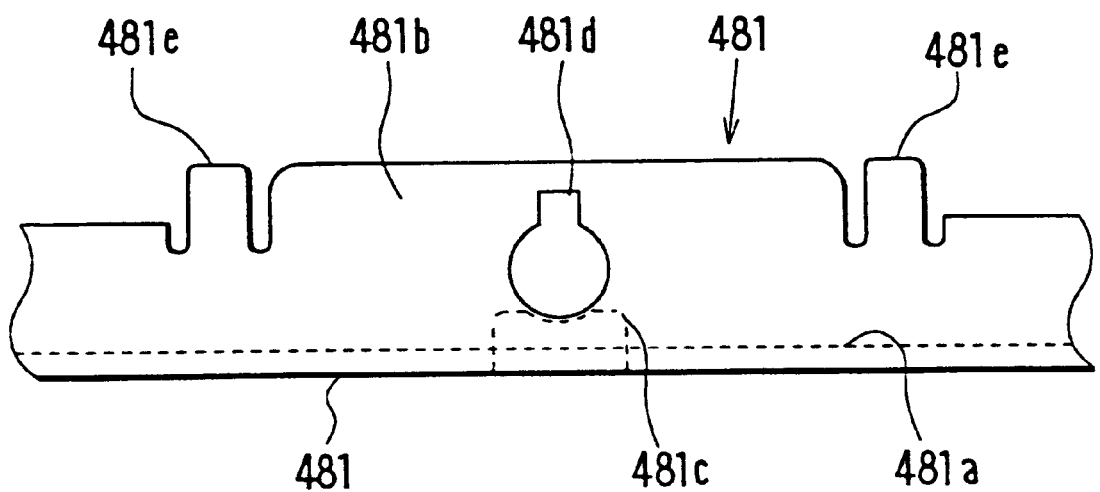
FIG. 8A is a front view of a main plate.

The protrusion portion 481c which protrudes from the main plate 481 toward the space 485 and the protrusion portion 482c (see FIG. 9) which protrudes from the sub plate 482 toward the space 485 are for positioning the nut 489 in the gap 488. A protrusion 489a of the nut 489 is fitted into a recess portion 481d (see FIGS. 6 and 8A) formed in a side wall portion 481b of the main plate 481 to construct a stopper of rotation of the nut 489.

On each side wall portion 481b of the main plate 481, there are formed two staked protrusion portions (staked portions) for fixedly connecting the sub plate 482 to the main plate 481. Each staked protrusion portion 481e is folded to be plastically deformed toward each side wall portion 482b of the sub plate 482, so that both plates 481 and 482 are staked and fixedly connected to each other.

Figure 8B:
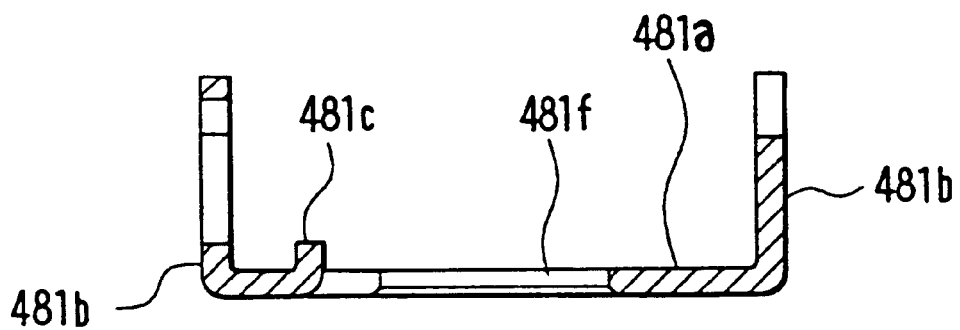
FIG. 8B is a cross sectional view of the main plate.
Figure 9A:
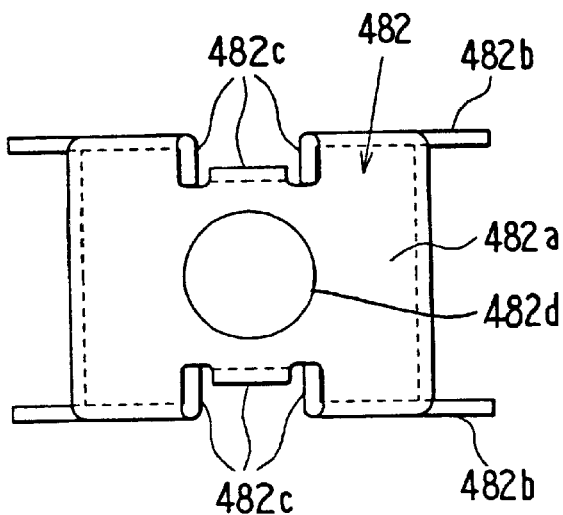
FIGS. 9A–9C are trihedral views of a sub plate.
Figure 9C:
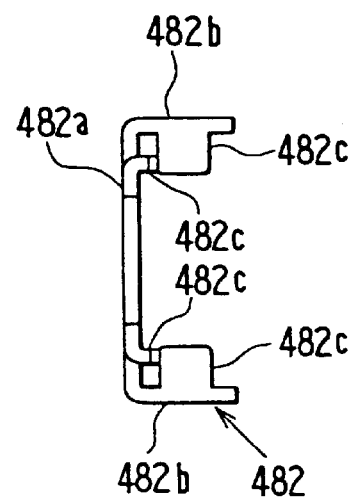
Figure 9B:
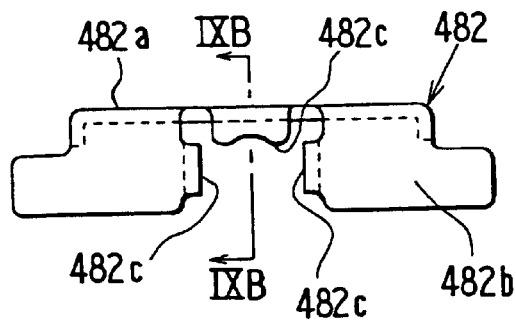
Figure 9D:
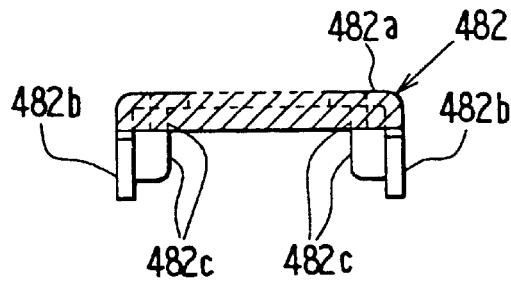
FIG. 9D is a cross sectional view of the sub plate.

The pin member 483 is fitted into a hole 481f (see FIG. 8B) of a bottom portion 481a of the main plate 481 and a co hole 482d (see FIG. 9A) of a bottom portion 482a of the sub plate 482. After being inserted into the holes 481f and 482d, the pin member 483 is enlarged from the inside (hereinafter this work is referred to as an enlarging pipe work) to be fixedly connected in the holes 481f and 482d by staking.

Both plates 481 and 482 are made of aluminum as core material, and a surface of the main plate 481 at a side of both core portions 2 and 3 and both wall surfaces of the sub plate 482 are covered with a brazing material. Both plates 481 and 482 and the pin member 483 are brazed and connected to each other by the brazing material. A brazing process (a process where the heat exchanger is heated in a furnace) is performed after staking of the staked protrusion portion 481e and the enlarging pipe work are performed.

Figure 10:
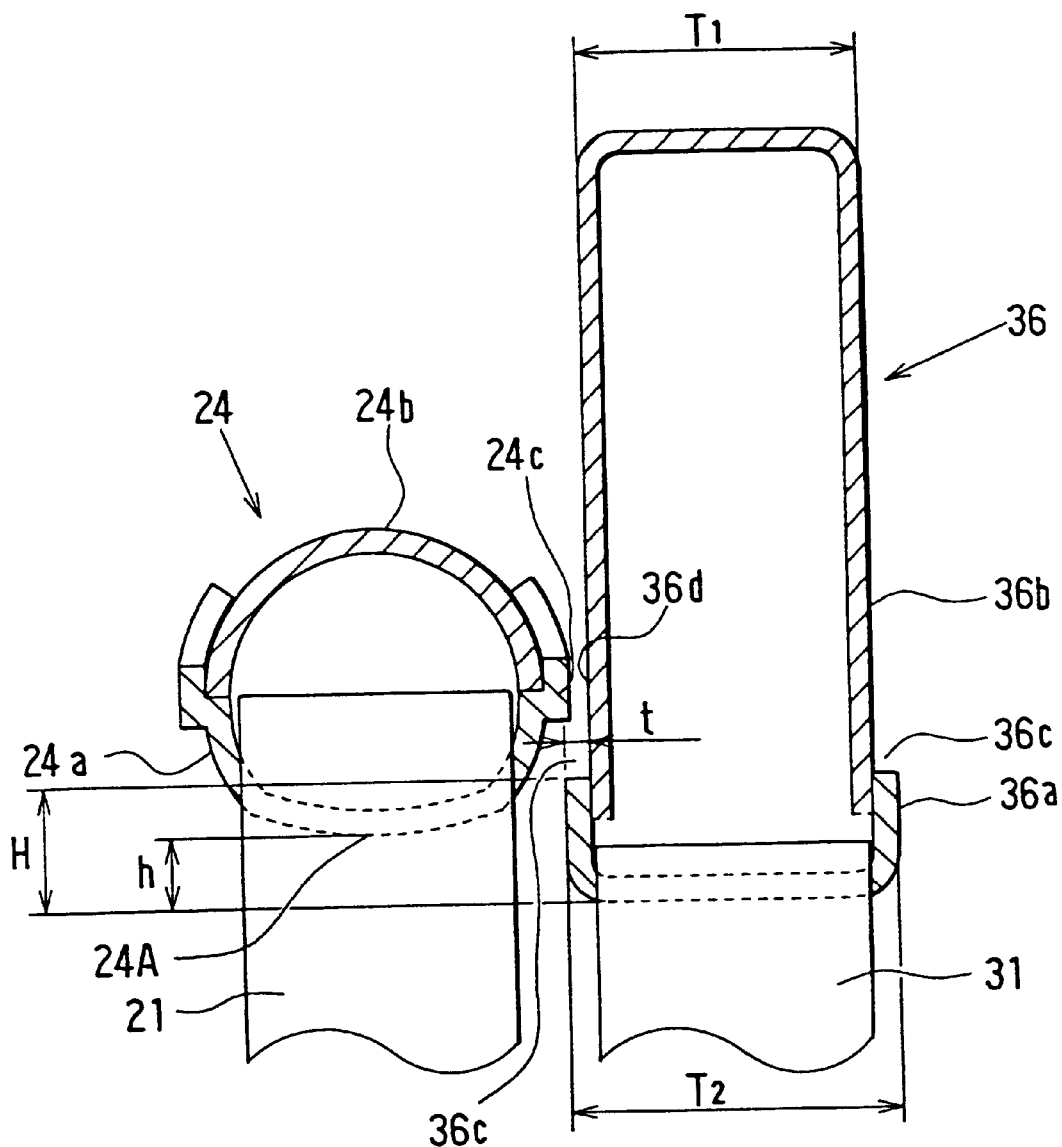
FIG. 10 is a cross sectional view taken along the X—X line of FIG. 1.

FIG. 10 shows a cross section taken along the line X—X of FIG. 1. As shown in FIG. 10, the second radiator tank 36 includes a radiator core plate 36a made of aluminum and connected to the radiator tube 31 and a radiator tank body portion 36b made of aluminum and connected to the radiator core plate 36a to form a space in the second radiator tank 36.

A thickness T1 of the radiator tank body portion 36b (a size in a direction perpendicular to the longitudinal direction of both tubes 21 and 31) is smaller than a thickness T2 of the radiator core plate 36a. Therefore, connecting portions of both of the radiator core plate 36a and the radiator tank body portion 36b are formed on a portion where a step portion 36c having a lower level portion (depression side) 36d depressed toward an opposite side of the first condenser tank 24 faces the first condenser tank 24 and an opposite portion thereof.

Similarly, the first condenser tank 24 includes a condenser core plate 24a made of aluminum and connected to the condenser tube 21 and a condenser tank body portion 24b made of aluminum and connected to the condenser core plate 24a to form a space in the first condenser tank 24.

The first condenser tank 24 is shifted outwardly in the longitudinal direction of both tubes 21 and 31 in such a manner that a portion of the first condenser tank 24, which is closest to the second radiator tank 36, i.e., a connecting portion (first adjacent portion) of the condenser core plate 24a and the condenser tank body portion 24b is positioned in correspondence with the lower level portion 36d of the step portion 36c.

Both core plates 24a and 36a and both tank body portions 24b and 36b are covered with brazing material. Both core plates 24a and 36a and both tank body portions 24b and 36b are connected and brazed to each other by the covered brazing material.

Each of the first radiator tank 34 and the second condenser tank 25 has the same structure; and therefore, the radiator tank 36 is intended to include both radiator tank 34 and 36, and similarly the condenser tank 24 is intended to include both condenser tanks 24 and 25, without being specifically identified.

Next, the protrusion lengths Lc and Lr of both cooling fins 22 and 32 will be described.

The larger the protrusion lengths Lc and Lr become, radiating areas of both cooling fins 22 and 32 becomes large; and therefore, the radiating amount is increased. However, a difference in a temperature, between both cooling fins 22 and 32 and air, becomes smaller toward top ends of the cooling fins 22 and 32; and therefore, the radiating amount cannot be increased in accordance with increases of the protrusion lengths Lc and Lr.

Figure 11:
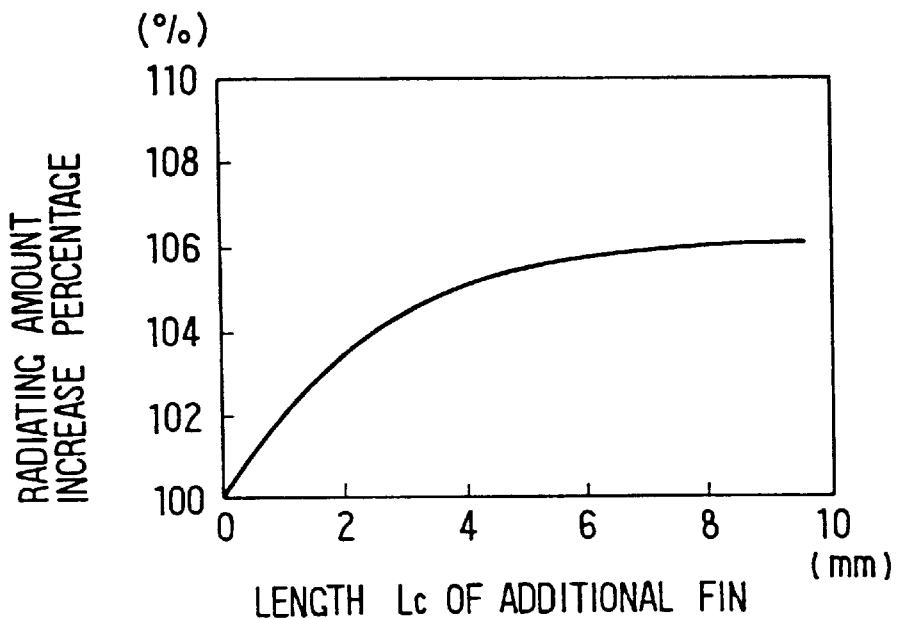
FIG. 11 is a graph showing a relationship between an increase percentage of a radiating amount of a cooling fin in a condenser core portion and a protrusion length of the cooling fin.
Figure 12:
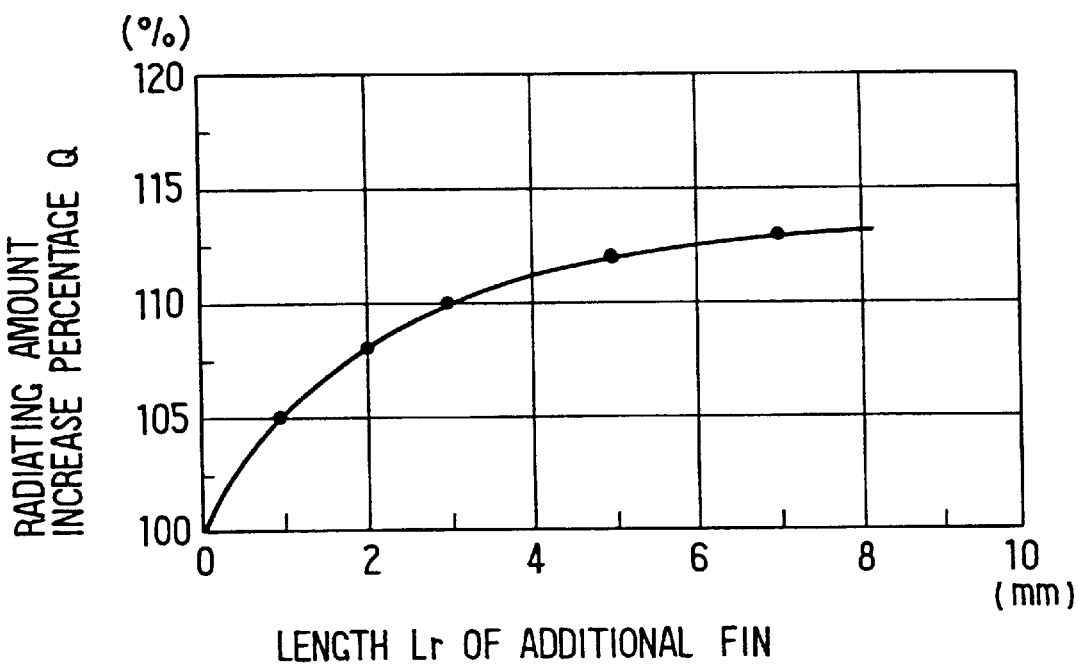
FIG. 12 is a graph showing a relationship between an increase percentage of a radiating amount of a cooling fin in a radiator core portion and a protrusion length of the cooling fin.

That is, in the case of the condenser core portion 2, when the protrusion length Lc is equal to 4 mm or more, as shown in FIG. 11, an increase percentage of the radiating amount is saturated. On the other hand, in the case of the radiator core portion 3, when the protrusion length Lr is equal to 7 mm or more, as shown in FIG. 12, an increase percentage of the radiating amount is saturated.

Figure 13:
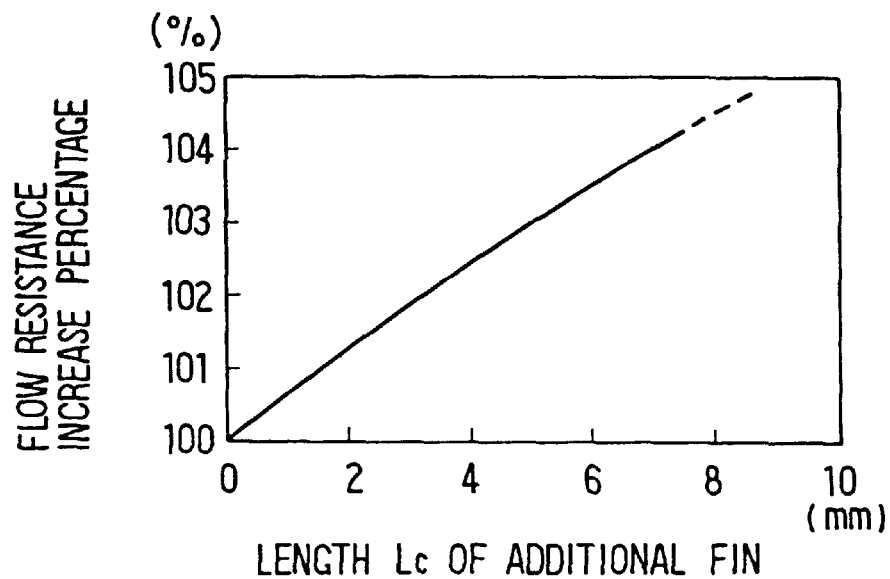
FIG. 13 is a graph showing a relationship between an increase percentage of a flow resistance of air passing through a cooling fin in a condenser core portion and a protrusion length of the cooling fin.

Further, when the protrusion lengths Lc and Lr increase, a flow resistance of air passing through both core portions 2 and 3 increases substantially linearly in accordance with the protrusion lengths Lc and Lr, as shown in FIG. 13.

The above-described study has been obtained from a result of numerical analysis by a finite element method of a case when air having a constant speed (2 m/sec.) is supplied from the condenser core portion 2 under conditions where a pitch of the louver is 1 mm, an angle of the louver is 23, a height of the cooling fin is 8 mm, and a gap distance L formed between both tubes 21 and 31 is 10 mm, in a corrugated cooling fin with louvers.

Further, inventors of the present invention have tried numeric analysis by various calculation conditions other than the above-described calculation condition. As a result, it becomes apparent that, as long as the gap distance L is in a range of 4–10 mm, the increase percentage of the radiating amount and the flow resistance are substantially expressed by functions of the protrusion lengths Lc and Lr, as shown in FIGS. 11–13, independently of the thickness and the height of the cooling fin.

Figure 14:
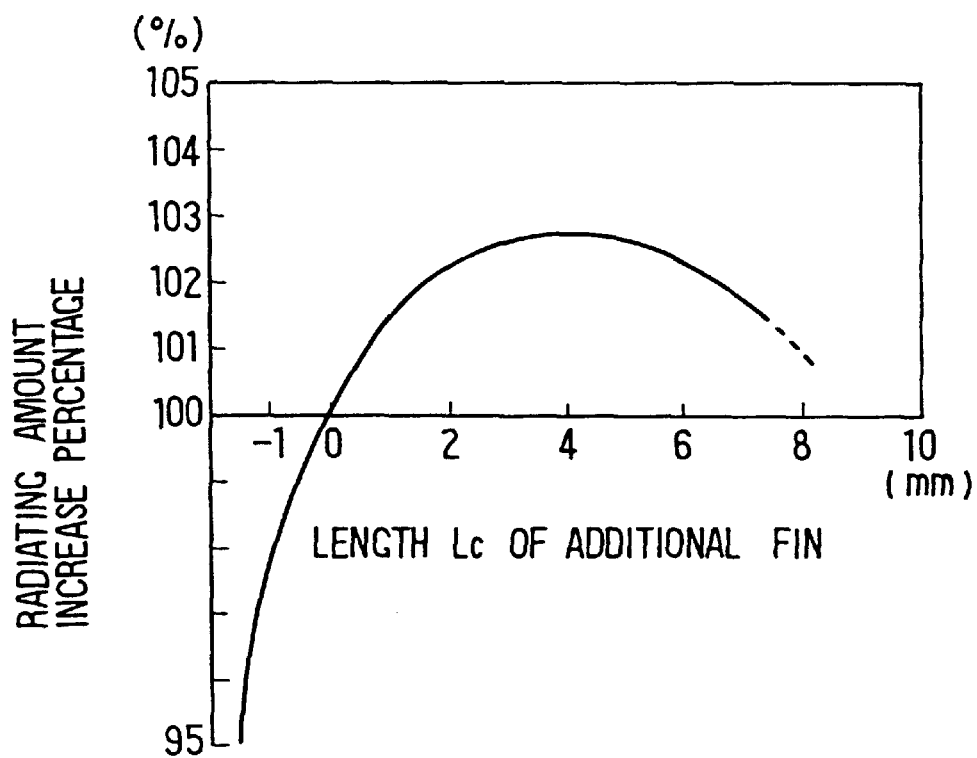
FIG. 14 is a graph showing a relationship between an increase percentage of a radiating amount of a cooling fin and a protrusion length of the cooling fin, into which a flow resistance is considered.
Figure 15:
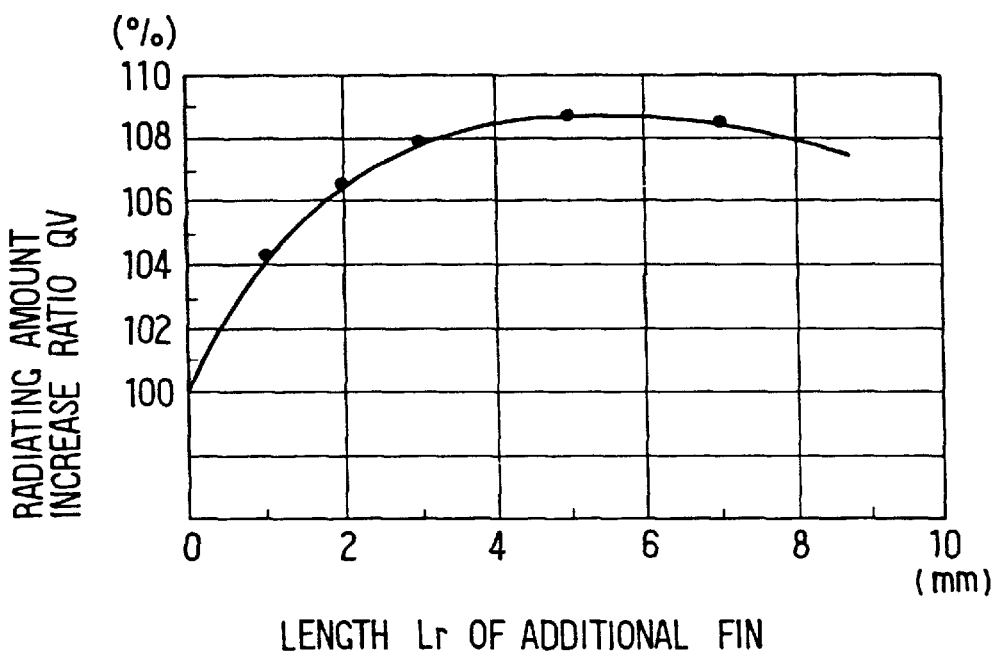
FIG. 15 is a graph showing a relationship between an increase percentage of a radiating amount of a cooling fin and a protrusion length of the cooling fin, into which a flow resistance in a radiator core is considered.

If the flow resistance becomes large and the amount of air passing through the cooling fan lowers, an amount of heat radiated from both core portions 2 and 3 per time lowers, and a heat-exchange efficiency lowers. A relationship between the protrusion lengths Lc and Lr and the increase percentage of the radiating amount while considering the flow resistance can be obtained as shown in FIGS. 14 and 15.

That is, in the condenser core portion 2, the increase percentage of the radiating amount is maximized when the protrusion length Lc is approximately 4 mm and lowers gradually therefrom. In the radiator core portion 3, the increase percentage of the radiating amount is maximized when the protrusion length Lr is 5–6 mm and lowers gradually therefrom.

Next, a connection ratio E/F (see FIG. 4) of both cooling fins 22 and 32 will be described.

When the connection ratio E/F increases, the connecting portion 45 of both cooling fins 22 and 32 increases. Therefore, the heat amount moving from the radiator core portion 3 to the condenser core portion 2 increases, and a heat-exchange efficiency in the condenser core portion deteriorates.

The inventors have searched and researched a relationship between a deterioration amount of the heat-exchange efficiency in the condenser core portion 2 and the connection ratio E/F quantitatively. As a result, as shown in FIG. 16, it becomes apparent that, the deterioration amount of the heat-exchange efficiency in the condenser core portion 2 increases substantially linearly in accordance with an increase of the connection ratio E/F, and when the connection ratio E/F is equal to 0.05 or less, it is possible to suppress the deterioration amount of the condenser within 2%.

Figure 16:
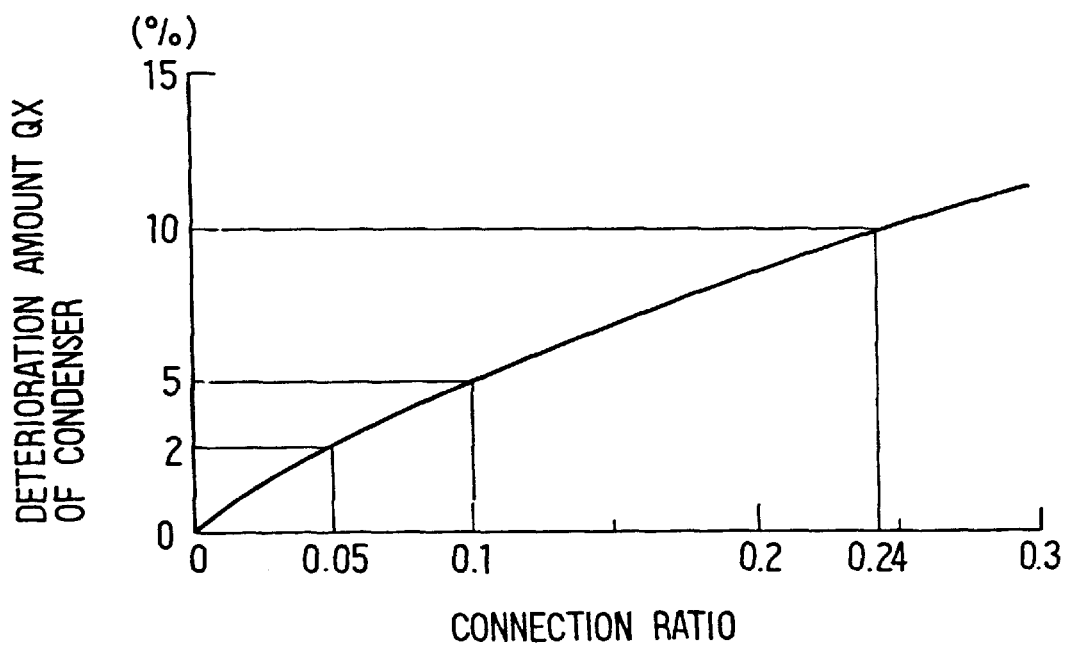
FIG. 16 is a graph showing a relationship between a deterioration amount of a condenser and a connection ratio.

The deterioration amount of the condenser in the vertical axis of FIG. 16 is expressed by dividing a difference between the heat-exchange amount in the case without having the connecting portion 45 (in the state where both core portions 2 and 3 are completely independent) and the heat-exchange amount in the case having the connecting portion 45 with the heat-exchange amount in the case without having the connecting portion 45.

Next, feature of the embodiment will be described.

The cross section of the pin-received portion 484 forms a closed cross-section space generally rectangular in shape, and the pin member 483 is connected to two positions of the bottom portions 481*a* and 482*a* of both plates 481 and 482, while passing through the space 485.

In this way, the pin-disposed portion 484 is constructed by a shell structure which is superior in mechanical strength, and the shell structure of the pin-receiving portion 484 can be more rigid, because the pin member 483 is connected at two positions while passing through the space 485. Therefore, even if a partial concentration load is applied with the pin member 483 as a center to the pin-receiving portion 484, it is possible to maintain sufficient mechanical strength.

If the pin member 483 is connected only to the bottom portion 482*a* of the sub plate 482, both side wall portion 482*b* and the bottom portion 482*a* are deformed similar to a concentrated load being applied to a beam of a gate-shaped frame.

In contrast, according to the embodiment, because one end of the pin member 483 is connected to the bottom portion 481*a* of the main plate 481 disposed at a side of both core portions 2 and 3, when a vibrating force directed to a center of both core portions 2 and 3 in parallel with the axial direction of the pin member 483 is applied, the vibrating force can be received not only by the pin-receiving portion 484 but also by both core portions 2 and 3 through the main plate 481 disposed at a side of both core portions 2 and 3. Therefore, because a deformation amount of the pin-receiving portion is reduced, a stress generated in the pin-receiving portion 484 becomes small, so that it is possible to improve the mechanical durability of the pin-receiving portion 484.

Further, because both plates 481 and 482 are connected to form the space 485, as compared with when the pin-receiving portion 484 is constructed by a rectangular pipe integrally forming the space 485, it becomes easy to assemble and connect the pin member 483 to the pin-receiving portion 484. Therefore, because assembling and manufacturing performance can be improved, manufacturing cost of the bracket 48 as well as the heat exchanger 1 can be reduced.

Further, because the inner edge shape of the cross section of the pin-receiving portion 484 is generally closed and rectangular, it is possible to improve the bending rigidity at the pin-receiving portion while preventing the mass of the bracket 48 from increasing.

Further, because the protrusions 486 and 487 of the pin member 483 are in contact with the respective plates 481 and 482 inside the space 485, when a vibrating force acts parallel to the axial direction of the pin member 483, the pin-receiving portion 484 receives a tensile load from the inside. Therefore, because a buckling load to crush the pin-receiving portion 484 is not applied to the pin-receiving portion 484, it is possible to improve the mechanical durability of the pin-receiving portion.

Further, because the brazing process is performed after the staking work of the staked protrusion portion 481*e* and the enlarging pipe work, it is possible to braze both plates 481 and 482 and the pin member 483 while contact portions thereof are in contact with one another. Therefore, the brazing process can be more reliably performed, and the deterioration of the mechanical strength of the pin-receiving portion 484 due to the faulty brazing can be prevented.

In the heat exchanger 1 according to the embodiment, the connecting work of the pin member 483 is finished simultaneously when the brazing process is completed. Therefore, there is no process for assembling the bracket where the pin member is disposed to the side plate by a bolt. Accordingly, because the number of steps in the assembling processes can be reduced, it is possible to improve the mechanical strength of the pin-receiving portion 484 while reducing the manufacturing cost.

Because a vibrating force in proportion to the mass of the blower 50 and the fan shroud 51 is applied to the nut 489 for connecting the fan shroud 51 by a bolt, the portion where the nut 489 is disposed needs high mechanical strength, similar to the portion where the pin member 483 is connected.

For this necessity, according to this embodiment, because the nut 489 is disposed in the pin-receiving portion 484, it is not necessary to further improve the mechanical strength of the portion where the nut 489 is disposed against the vibrating force in proportion to the mass of the blower and the like, so that the manufacturing cost can be suppressed.

Further, because the connection portion 24*c* of the condenser tank 24, which is closest to the radiator tank 36, is disposed to a position in correspondence with the lower level portion 36*d* of the step portion 36*c*, it is possible to prevent an interference between both tanks 24 and 36 with the depression t formed by the step portion 36*c*.

Still further, because the interference between the condenser tank 24 and the radiator tank 36 is prevented by the step portion 36*c*, it is not necessary to downsize both tanks 24 and 36 greatly. Therefore, it is possible to prevent an increase of pressure loss in both tanks 24 and 36.

As described above, according to the embodiment, it is possible to reduce the thickness size of the heat exchanger while preventing the deterioration of the heat-exchanging capacity of the heat exchanger.

As being apparent from the above description, since the condenser tank 24 and the radiator tank 36 can be disposed closer to each other with the depression distance t, in the embodiment as shown in FIG. 10, the connection portion 24c is positioned at a side of the radiator tank 36 adjacent the top portion of the step portion 36c of the radiator 36.

As described above, because the connection portion 24c is shifted outwardly in the longitudinal direction of both tubes 21 and 31 to the position in correspondence to the lower portion 36d, a core area of the condenser core portion 2 increases with the outwardly shifted distance h.

However, as being apparent from FIG. 10, because the radiator tank 36 faces the portion in correspondence with the increased core area, an amount of air passing through the condenser core portion 24 does not increase in accordance with the increased core area. Therefore, it is not possible to increase the heat-exchanging capacity in accordance with the increased core area.

Accordingly, even if the connection portion 24c is shifted outwardly at random, material cost of the condenser tube 21 and the cooling fin 22 increases only, and a technical advantage cannot be obtained.

As a result of various study and examinations by the inventors, it comes to a conclusion that the wall surface 24A of the condenser core plate 24a, which faces the condenser core portion 2, is desirably positioned at a side of the radiator core portion 3 than a position in correspondence with the step portion 36c (h H).

Further, because the amount of the cooling water flowing in the radiator core portion 3 is sufficiently larger than the amount of the refrigerant flowing in the condenser core portion 2, generally, a volume (size) of both condenser tanks 24 and 25 is smaller than that of both radiator tanks 34 and 36.

According to the embodiment, because both condenser tanks 24 and 25 having a smaller volume are shifted outwardly, there is no variation of the dimension in the direction of both tubes 21 and 31 in view of the entire heat exchanger. Therefore, it is possible to reduce the thickness of the heat exchanger while preventing the heat exchanger from being large-sized in the direction of both tubes 21 and 31.

Further, because the step portion 36c is formed at the connection portion between the radiator core plate 36a and the radiator tank body 36b, it is not necessary to newly form, on the radiator tank 36, a clearance for preventing the interference with the connection portion 24c, such as a concave portion. Therefore, the manufacturing cost of the radiator tank 36 can be prevented from increasing, with the result that the manufacturing cost of the heat exchanger can be prevented from increasing.

Still further, because heat moves from the radiator core portion 3 to the condenser core portion 2 through the connection portion 45, as shown in FIG. 16, the smaller the connection ratio E/F is, the smaller the amount of the moving heat becomes. Further, as shown in FIG. 14, by increasing the protrusion length Lc of the cooling fin 22 by a predetermined amount, it is possible to improve the increase percentage of the radiating amount in the condenser core portion 2.

Therefore, by selecting the protrusion length Lc and the connection ratio E/F appropriately, the deterioration amount of the condenser by providing the connection portion 45 can be cancelled by the increase of the radiating amount by protruding the cooling fin 22. Because the cooling fin 22 protrudes toward the gap 46 between both core portions 2 and 3, it is possible to prevent a size of the outer shape of the heat exchanger 1 from being large-sized.

In this embodiment, the protrusion length Lc is approximately 1.7 mm, and the connection ratio E/F is approximately 0.05. That is, because the connection ratio E/F is approximately 0.05, the deterioration amount is approximately 2%; however, because the protrusion length Lc is approximately 1.7 mm, the radiating amount in the condenser core portion 2 increases with approximately 2%. Therefore, the deterioration amount of the condenser is cancelled by the protruding the cooling fin 22.

The above-described length needs to be appropriately selected by thicknesses, shapes, material compositions, louvers 22b and 32b, or the like, of the cooling fins 22 and 32. When the connection ratio E/F is equal to 0.5 or less, it is preferable that the protrusion length Lc is within 1.7–7 mm.

A distance Ls of a gap 47 may be set to such an extent that the heat conductivity can be effectively insulated. More specifically, the distance Ls is approximately 0.5–2 mm. In this embodiment, the distance Ls is set to approximately 0.5 mm, and the distance L of the gap between both tubes 21 and 31 is approximately 4 mm.

Further, because the cooling fin 32 of the radiator core portion 3 protrudes toward the condenser core portion 2, the radiating amount in the radiator core portion 3 increases, as shown in FIG. 15. Therefore, the size of the outer shape of the heat exchanger 1 can be suppressed from being large-sized, and the radiating amount of the radiator core portion 3 can be increased. In this embodiment, the protrusion length Lr is approximately 1.8 mm, and the radiating amount can be increased by approximately 5%.

By selecting each of the protrusion lengths Lc and Lr appropriately, it is possible to adjust a radiating capacity of the condenser core portion 2 or a radiating capacity of the radiator core portion 3 easily. Therefore, the heat exchanger can be desirably modified without being greatly modified.

Further, out of a plurality of the connection portions 45, between one connecting portion 45 and another connecting portion 45, there are formed a plurality of folded portions 22a (in this embodiment, 5–10 folded portions 22a) of both cooling fins 22 and 32. It is therefore possible to reduce the total of the cross sectional area of the plurality of the connection portions 45, which is a cross sectional area of the heat conductivity path of the heat conducting between both cooling fins 22 and 32. Therefore, the amount of the heat conducting between both cooling fins 22 and 32 can be reduced, so that the heat conductivity between both cooling fins 22 and 32 can be effectively insulated.

Further, because the cross sectional area of the heat conductivity path is reduced to insulate the heat conductivity between both cooling fins 22 and 32, as compared with a case where a length of the heat conductivity path is elongated to insulate the heat conductivity between both cooling fins 22 and 32, the distance between both cooling fins 22 and 32 can be suppressed from increasing. Therefore, it is possible to insulate the heat conductivity between both cooling fins 22 and 32 while suppressing the heat exchanger 1 from being large-sized.

Still further, because both cooling fins 22 and 32 are integrally formed, the manufacturing cost of both cooling fins 22 and 32 can be reduced, with the result that the manufacturing cost of the heat exchanger 1 can be reduced.

Recently, to reduce a space in the engine compartment, components in the engine compartment are located closer to one another to such an extent that a repairing worker can work thereon. Similarly, the radiator core portion 3 is located closer to the other components.

However, if the radiator core portion 3 is simply disposed closer to the other components, the air flow in the engine compartment may deteriorate (be retarded); and therefore, the amount of air passing through the radiator core portion 3 decreases, and the radiating capacity of the radiator core portion 3 may deteriorate.

Figure 17:
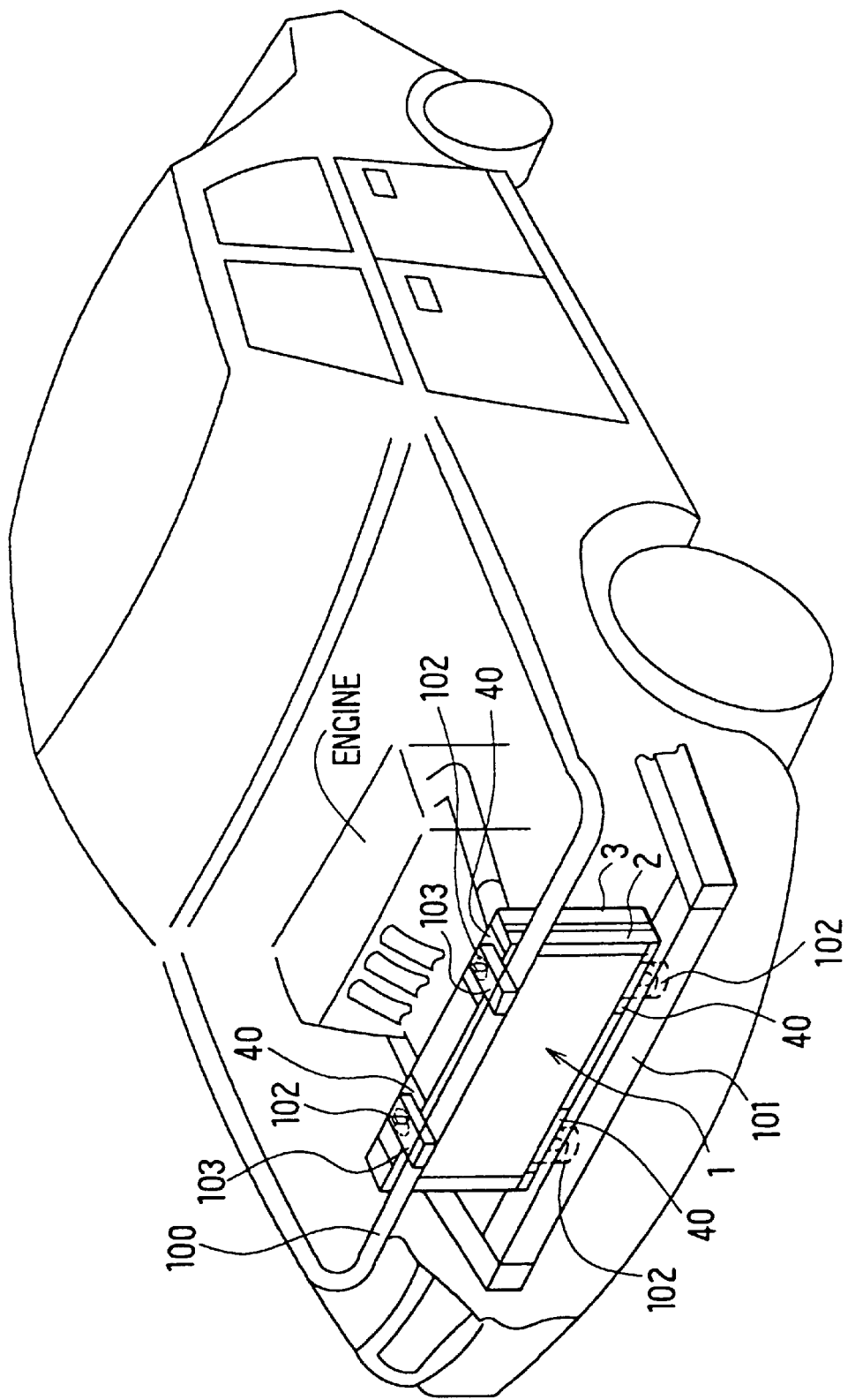
FIG. 17 is a perspective view showing a heat exchanger according to the present invention, which is assembled into a vehicle.
Figure 18:
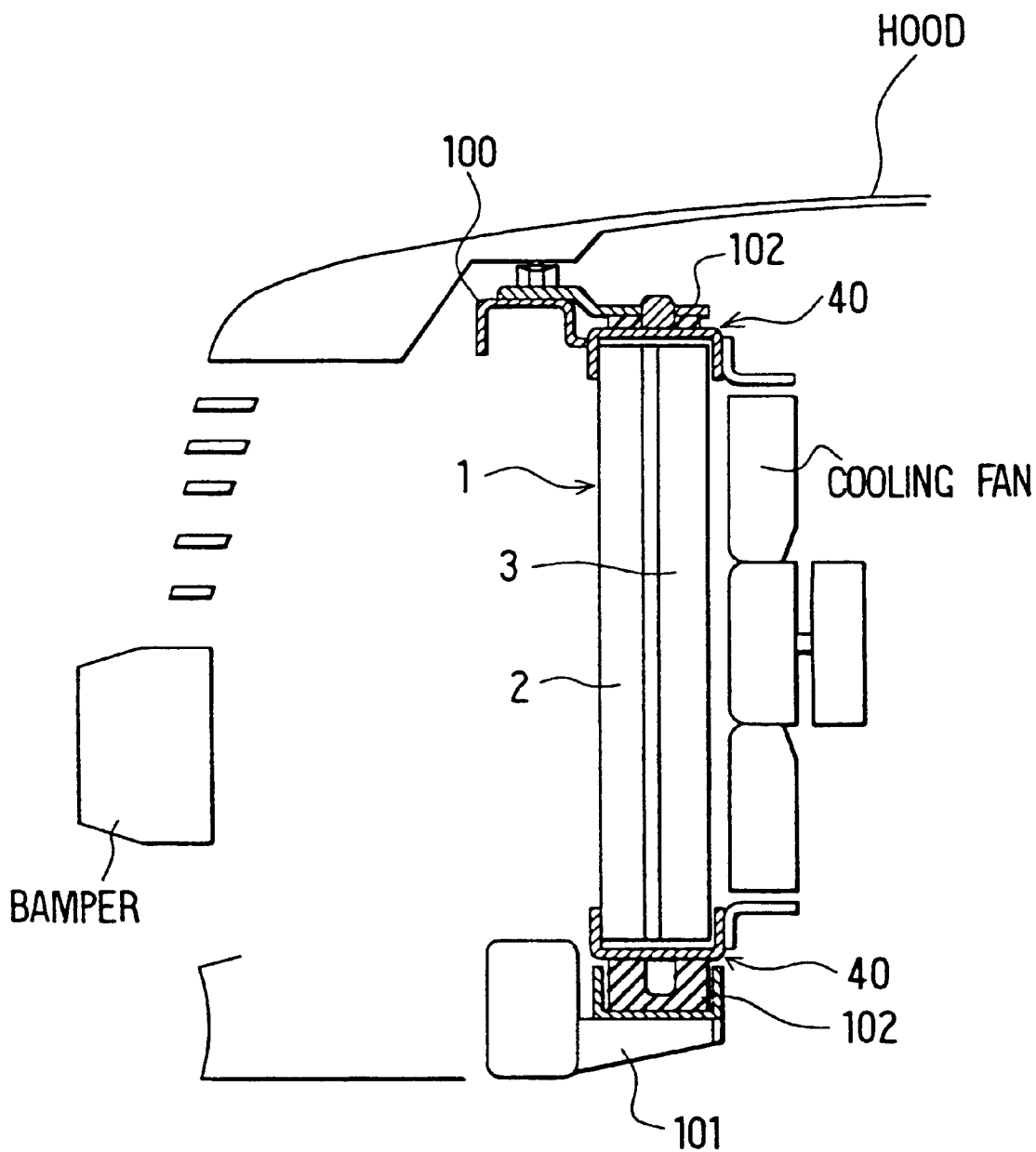
FIG. 18 is a cross sectional view showing the heat exchanger according to the present invention, which is assembled into a vehicle.
Figure 19:
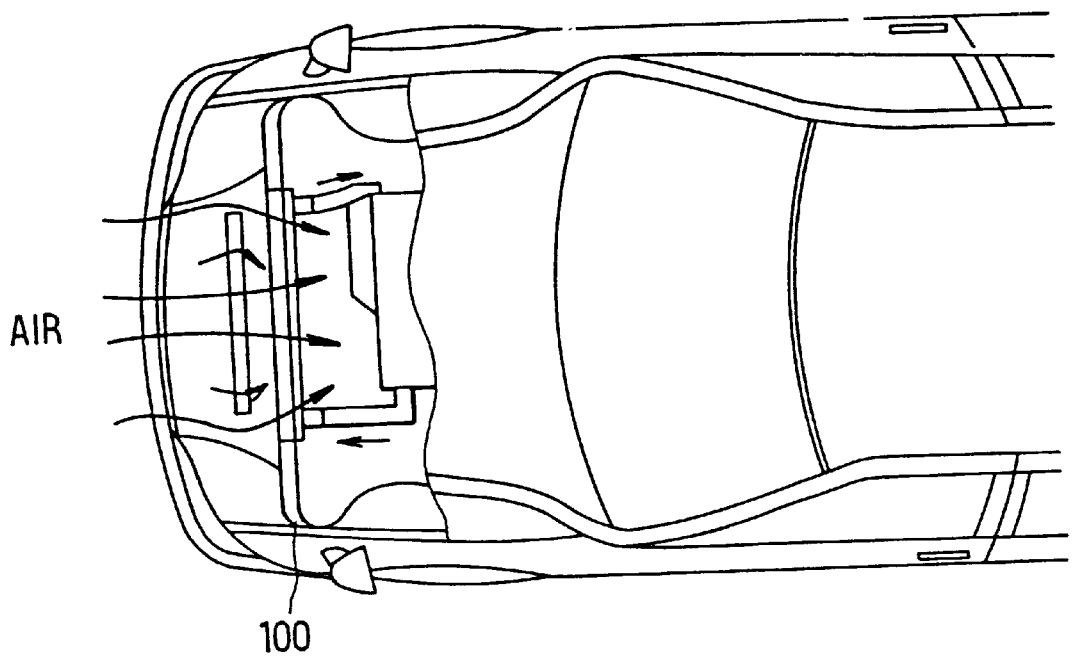
FIG. 19 is a front view showing the heat exchanger according to the present invention, which is assembled into a vehicle.

Generally, to secure sufficient amount of the air into the radiator core portion 3, the radiator core portion 3 is disposed at a front side of the vehicle (engine compartment) as shown in FIGS. 17–19, and is disposed such that air flowing into the engine compartment effectively gathers in the radiator core portion 3.

FIGS. 17 to 19 show a state where the heat exchanger 1 according to the embodiment is assembled in the vehicle. The heat exchanger 1 is assembled in the vehicle while the pin members 483 are inserted into anti-vibration rubbers disposed at a side of an upper reinforcement member (upper cross member) 100 and at a side of a lower reinforcement member (lower cross member) 101. At the side of the upper reinforcement member 100, the heat exchanger is not directly assembled into the upper reinforcement member 100 but supported with a vehicle-side bracket 103 assembled in the upper support 100 by a bolt.

A gap (distance) between the components disposed close to the radiator core portion 3 other than the radiator core portion 3 and the vehicle reinforcement member such as the upper reinforcement member 100 or the lower reinforcement member 101 is reduced to construct a layout in which the air flowing from the front side of the vehicle into the engine compartment does not flow directly into the air downstream side while bypassing the radiator core portion 3.

Figure 20:
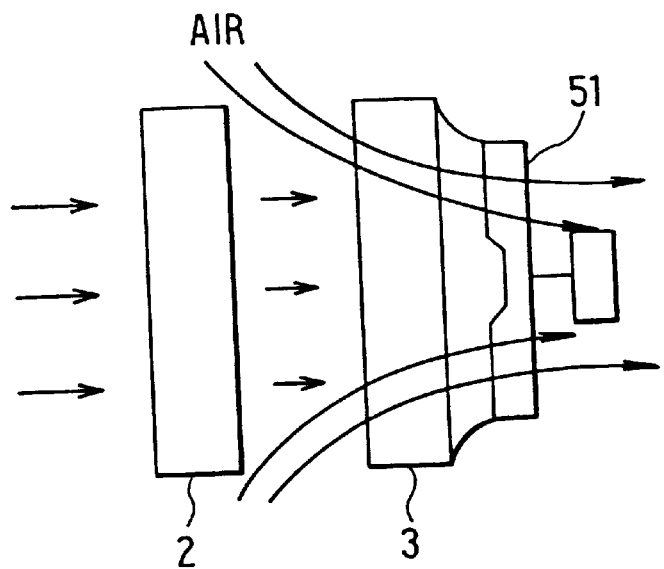
FIG. 20 is a schematic view showing an air flow when the heat exchanger is mounted on a vehicle.

Therefore, the air flowing from the front side of the vehicle into the engine compartment flows so as to gather in the radiator core portion 3 as approaching the radiator core portion 3, as shown in FIG. 20. Accordingly, if the condenser core portion 3 is disposed at an air upstream side of the radiator core portion 2, the air flowing from the front side of the vehicle is divided into an air flow passing through the radiator core portion 3 through a gap 46 between the condenser core portion 2 and the radiator core portion 3 while bypassing the condenser core portion 3 and a linear air flow passing through both core portions 2 and 3.

In this state, if the condenser tank 24 and the radiator tank 36 are disposed close to each other, the gap 46 is substantially closed, and the air flow passing through the gap 46 while bypassing the condenser core portion 2 is interrupted. Accordingly, the air bypassing the condenser core portion 2 loses the way and starts to flow toward the radiator core portion 3.

Therefore, as in the embodiment, when the condenser tank 24 and the radiator tank 36 are disposed close to each other, the amount of the air passing through the condenser core portion 2 disposed at an air upstream side of the radiator core portion 3 increases with the amount of the air bypassing the condenser core portion 2 (this phenomenon is hereinafter referred as "duct effect"), and the heat-exchanging capacity of the condenser core portion 2 improves.

The inventors have searched the duct effect quantitively, and have examined a relationship between the distance L between both tubes 21 and 31 and the increase percentage of the amount of the air passing through the condenser core portion 2 in a heat exchanger for a vehicle, in which each of the protrusion lengths Lc and Lr is 0 mm and both d core portions are independent (the connection ratio E/F=0).

Figure 21:
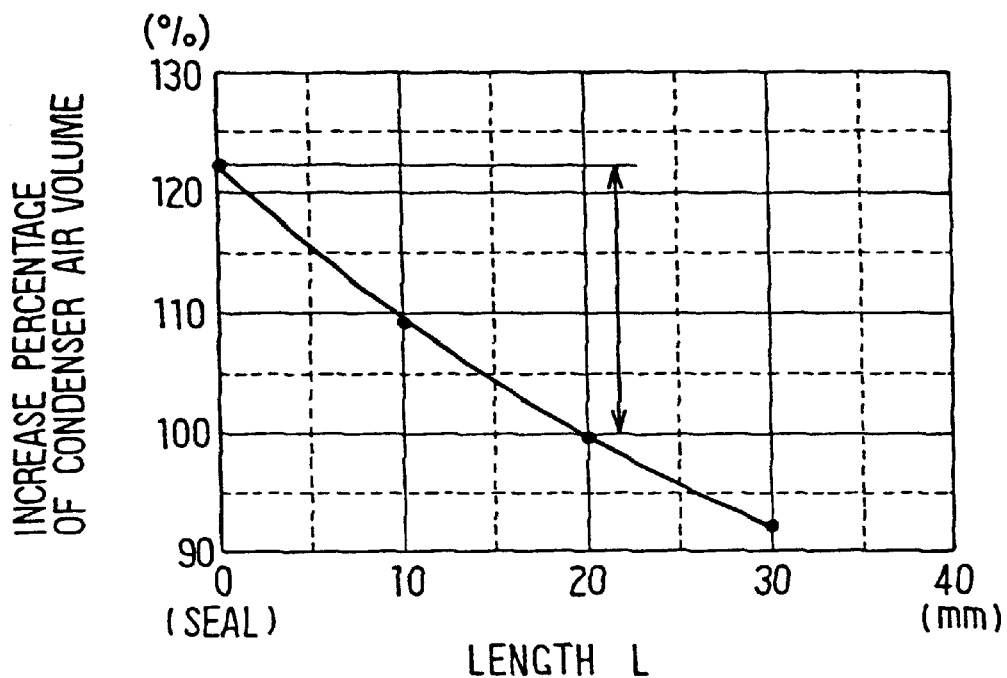
FIG. 21 is a graph showing a relationship between a distance L between both tubes and an amount of air passing through a condenser core portion.

FIG. 21 is a graph showing a result of the examination result, and the increase percentage is indicated as a standard when the average distance L between both tubes 21 and 31 is 20 mm (i.e., L=20 mm).

The result of the above-described examination has been obtained, by considering a state where the heat exchanger for a vehicle according to the present invention is mounted on the vehicle, as shown in FIG. 20, under a condition that the radiator core portion 3 is disposed at an air downstream side of the condenser core portion 2 and the cooling fan 51 is disposed at an air downstream side of the radiator core portion 3.

In the graph of FIG. 21, when the state of the distance L=0 is considered, it comes to the following conclusion. That is, in the state of the distance L=0, because both core portions 2 and 3 are disposed close to each other, there is no occurrence of the air flow bypassing the condenser core portion 2. As viewed from the air flow, the state of the distance L=0 in the examination is approximate to the state where the gap 46 between the both core portions 2 and 3 are closed, i.e., the state where the condenser tank 24 and the radiator tank 36 are disposed close to each other.

Therefore, as shown in FIG. 21, in view of the examination result in which the smaller the distance L is (i.e., the closer the distance L approaches 0), the larger the amount of the air passing through the condenser core portion 2 is, and the above-described consideration, the duct effect can be obtained by disposing the condenser tank 24 and the radiator tank 36 close to each other.

Further, in the heat exchanger in which the condenser tank 24 and the radiator tank 36 are disposed close to each other, because pressure loss when the air passes through the gap 46 between both core portions 2 and 3 is much smaller than that when the air passes through both core portions 2 and 3, the pressure loss when the air passes through the gap 46 can be neglected. That is, the state of the distance L=0 in the examination is approximate quantitively to the state where the condenser tank 24 and the radiator tank 36 are disposed close to each other.

Therefore, in a heat exchanger in which each of the protrusion lengths Lc and Lr is 0 mm and both core portions are independent, when the distance L is set to 20 mm (L=20 mm), the increase percentage of the air amount by the duct effect becomes a difference between the increase percentage of the air amount when the distance L=0 and the increase percentage of the air amount when the distance L=20 mm, i.e., 20%.

Figure 22:
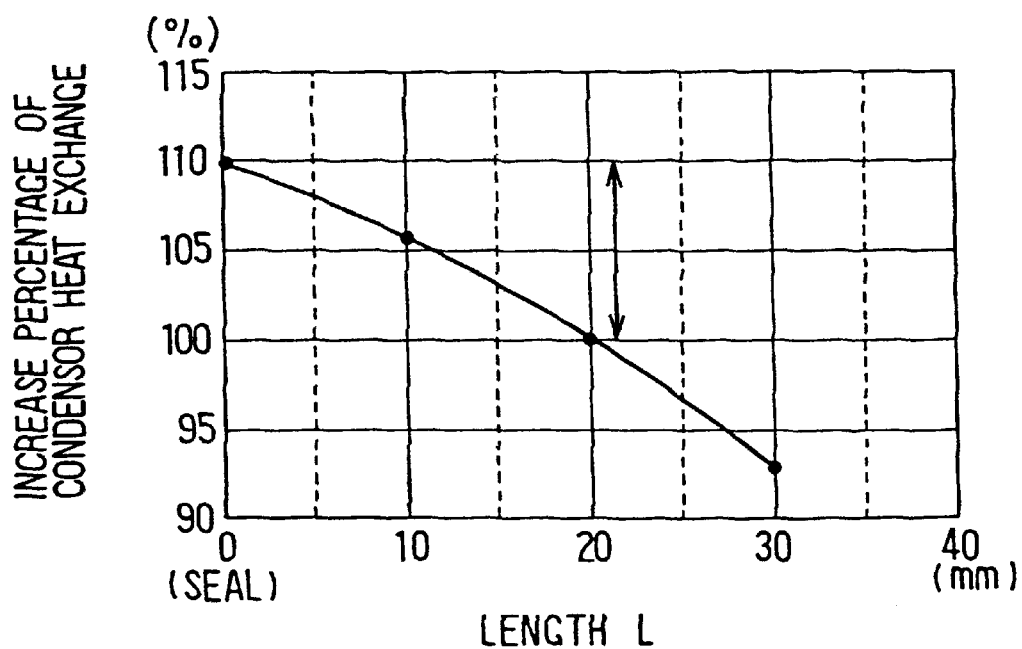
FIG. 22 is a graph showing a relationship between the distance L between both tubes and an increase percentage of the heat-exchange of the condenser core portion.

Further, FIG. 22 shows a relationship between the distance L and the increase percentage of the heat-exchange. Similar to FIG. 21, in FIG. 22, the state of the distance=0 is approximate to the state where the condenser tank 24 and the radiator tank 36 are disposed close to each other. Therefore, the smaller the distance L is (i.e., the closer the distance L approaches 0), the more the heat-exchange efficiency in the condenser core portion 2 improves.

The heat moves from the radiator core portion 3 toward the condenser core portion 2 through the side plate 48, so that the heat-exchange efficiency in the condenser core portion 2 may deteriorate. However, a portion of the side plate 48, effectively contributed to the heat movement, is of the small portion adjacent to both header tanks 34 and 36 of the radiator core portion 3, and the cross section thereof is sufficiently small, as compared with the core area of the condenser core portion 2. Therefore, the deterioration of the heat-exchange efficiency due to the heat movement can be substantially neglected.

As described above, because both cooling fins 22 and 32 are formed integrally with louvers 22b and 32b by a roller forming method, if the connection ratio E/F is reduced, it becomes difficult to from the connection portion 45, with the result that the manufacturing cost of the cooling fin may increase. Therefore, it is desirable that the connection ratio E/F is increased as much as possible in view of the manufacture of the cooling fin.

On the other hand, when the connection ratio E/F is increased, as described above, the heat-exchange of the condenser core portion 2 deteriorates; and therefore, it is not desirable that the connection ratio E/F is increased excessively.

For example, in the heat exchanger of the distance L=20 mm, because the heat exchange of the condenser core portion 2 can be increased with 10% (see FIG. 22) only by the duct effect, the connection ratio E/F can be increased to a value (the connection ratio E/F=0.24) corresponding to the deterioration amount 10% of the condenser.

When the connection ratio E/F is equal to 0.1 or less, the deterioration amount of the condenser is 5% (See FIG. 16). Therefore, considering the improvement 10% of the increase percentage of the heat-exchange by the duct effect, if the protrusion length (displaced amount) Lc is set to −1.5 mm (if the protrusion length Lc is set to −1.5 mm, the radiating amount of the condenser core portion 2 deteriorates with 5%, as shown in FIG. 14), the deterioration amount of the radiating amount of the condenser core portion 2) can be cancelled.

The protrusion length (displaced amount) Lc means a position of the end portion at the side of the radiator core portion 3, out of the cooling fin 22 of the condenser core portion 2 in the case where the direction from the condenser tube 21 toward the radiator tube 31 is a positive direction with the end portion at the side of the condenser tube 21, out of the condenser tube 21 being a standard position (0). That is, the protrusion length (displaced amount) Lc=−1.5 mm indicates the state where the end portion of the cooling fin 22 is disposed at an air upstream side from the end portion the condenser tube 21.

The inventors have compared and examined the manufacturing cost of (the cooling fins of) the heat exchangers having various specifications and the heat-exchanging capacity of the condenser core portion 2. As a result, it comes to the conclusion that the connection ratio E/F is properly equal to 0.1 or less. Further, considering the improvement of the increase percentage of the heat-exchange by the duct effect, as described above, the protrusion length (displaced amount) Lc may be within −1.5–7 mm.

In the above-described embodiment, each of the tanks is constructed by the core plate and tank body portion; however, each of the tanks may be integrally formed by an extruding process.

In the above-described embodiment, the connection portion 24c is positioned at the side of the radiator tank 36 from the top portion of the step portion 36c closest to the condenser tank 24, out of the radiator tank 36; however, the connection portion 24c may be positioned at the side of the condenser tank 24 from the top portion of the step portion 36c of the connection portion 24c.

A second embodiment of the present invention will be described.

Figure 23:
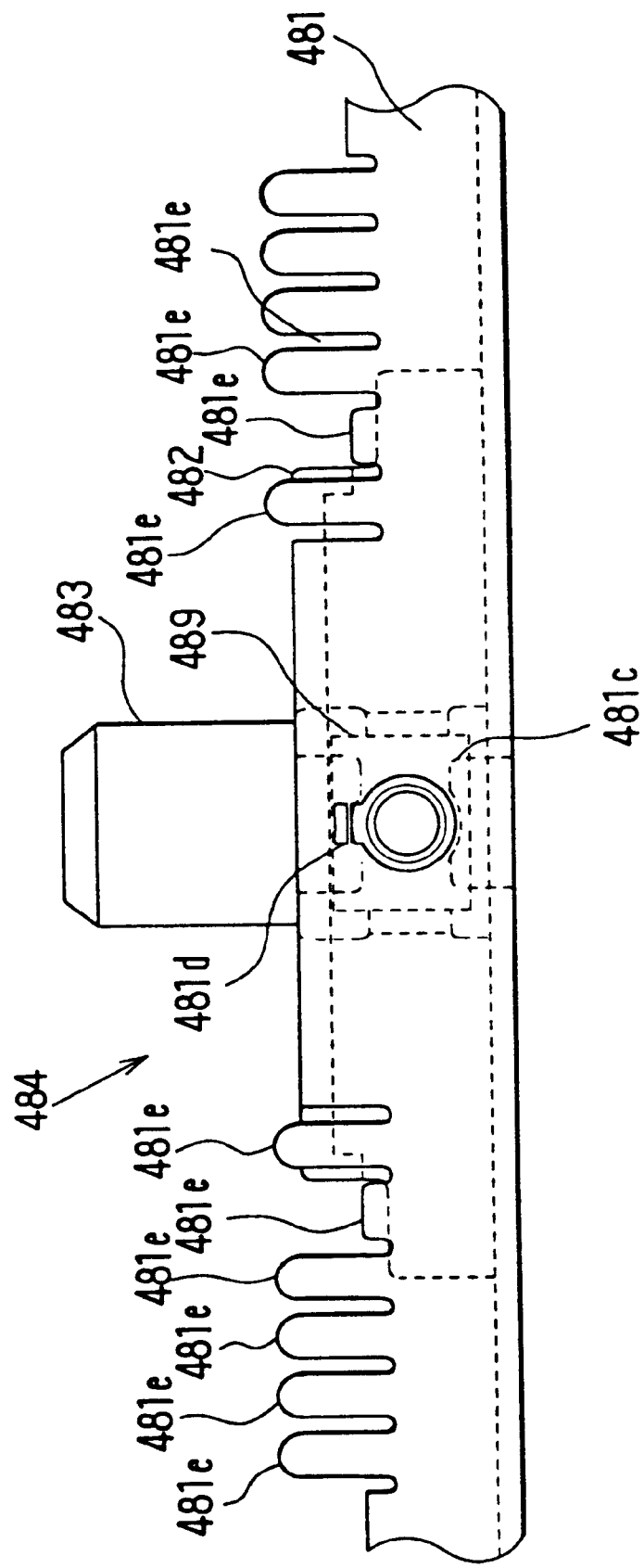
FIG. 23 is a front view of a bracket according to a second embodiment of the present invention.

The second embodiment copes with a variation in a size in a longitudinal direction of the bracket 48 corresponding to a kind of the vehicle. More specifically, as shown in FIG. 23, more than 3 staked protrusion portions 481e are formed on each side wall portion of the main plate 481.

In this way, when the work for staking the staked protrusion portions 481e is performed, by appropriately selecting the staked protrusion portions 481e to be staked, the sub plate 482 can be assembled into the main plate 481, in correspondence with the size of various kinds of the brackets 48 in the longitudinal direction.

In this embodiment and the first embodiment, by using two staked protrusion portions 481e per each side wall portion 481b, four staked protrusion portions 481e in total, the side plate 482 is fixedly connected to the main plate 481; however, the side plate 482 may be fixedly connected to the main plate 481 by using one staked protrusion portion per each side wall portion 481b, two staked protrusion portions 481e in total. Therefore, in this case, at least two staked protrusion portions 481e may be formed per each side wall portion 481b.

When the sub plate 482 is fixedly connected to the main plate 481 by two staked protrusion portions 481e in total, it is desirable to select the staked protrusion portions in a diagonal relationship with reference to the axis of the main plate 481.

In the above-described embodiments, the inner edge shape of the cross section of the pin-receiving portion is rectangle; however, the present invention is not limited thereto but may be of a triangular shape, a circular shape, and the other shapes.

In the above-described embodiments, the rectangular shape is formed by both plates 481 and 482 each having a U-shape; however, the present invention is not limited thereto, and the rectangular shape may be integrally constructed by using a rectangular pipe or a circular pipe.

In the above-described embodiments, the inner edge shape of the cross section of only the pin-receiving portion 484 forms the rectangular shape; however, an inner edge shape of the cross section over an entire longitudinal direction of the bracket may form a rectangular shape.

In the above-described embodiments, the present invention is employed in the heat exchanger for a vehicle, having the condenser core 2 and the radiator core 3; however, the present invention may be employed in a heat exchanger (condenser or radiator) having only a condenser core 2 or a radiator core 3.

In the above-described embodiments, both protrusion portions 486 and 487 of the pin member 483 are integrally formed with the pin member 483 on the entire periphery of the cylindrical outer wall surface 483a; however, the present invention is not limited thereto, and both protrusion portions 486 and 487 may be formed on a part of the cylindrical outer wall surface 483a.

In the above-described embodiments, the pin member 483 is formed of a pipe member; however, the present invention is not limited thereto, and the pin member 483 is formed of a stick member having a circular shape, a rectangular shape, or the like.

In the above-described embodiments, both plates 481 and 482 and the pin member 483 are connected by both of staking and brazing; however, those are connected only by staking.

Instead of the connection by staking and brazing, the other connecting means such as welding may be employed.

In the above-described embodiment, the blower 50 and the like are integrally assembled in the heat exchanger 50; however, only the heat exchanger may be independently assembled into the vehicle.

In the above described embodiments, the staked protrusion portion 481e is provided on the main plate 481; however, a staked protrusion portion may be provided on the sub plate 482.

Although the present invention has been fully described in connection with the preferred embodiments thereof with reference to the accompanying drawings, it is to be noted that various changes and modifications will become apparent to those skilled in the art. Such changes and modifications are to be understood as being included within the scope of the present invention as defined in the appended claims.

What is claimed is:

1. In a motor vehicle having a heat exchanger including;
a core portion having a plurality of tubes through which a fluid passes, an improved mounting arrangement comprising:
   a bracket disposed at an end of said core portion;
   a pin member mounting said heat exchanger on said vehicle, said pin member being disposed in said bracket while protruding in a direction crossing a longitudinal direction of said bracket; and
   a pin receiving portion formed in said bracket, for receiving said pin member therein, said pin receiving portion forming a closed cross sectional space as viewed from the longitudinal direction of said bracket;
   wherein said pin member passes through said space and is connected to said pin-receiving portion at plural positions.

2. A motor vehicle according to claim 1, wherein,
said pin-disposed portion includes:
   a main plate disposed at a side of said core portion; and
   a sub plate connected to said main plate; and
   said pin member is connected to both of said main plate and said sub plate.

3. A motor vehicle according to claim 2, wherein,
each of said main plate and said sub plate has side wall portions and a bottom portion, for forming a U-shape,
said closed space is formed by said U-shaped plates, and
said pin member is connected to said bottom portions.

4. A motor vehicle according to claim 3, wherein,
said pin member has an outer wall surface parallel to an axial direction of said pin member, said pin member having a main protrusion portion protruding from said outer wall surface in a direction crossing the axial direction of said pin member and contacting said main plate, said pin member further having a sub protrusion portion contacting said sub plate, and
both of said main protrusion portion and said sub protrusion portion are disposed inside said space.

5. A heat exchanger for a vehicle, comprising:
a core portion having a plurality of tubes through which a fluid passes;
a bracket disposed at an end of said core portion;
a pin member mounting said heat exchanger on said vehicle, said pin member being disposed in said bracket while protruding in a direction crossing a longitudinal direction of said bracket; and
a pin receiving portion formed in said bracket for receiving pin member therein, said pin receiving portion forming a closed cross sectional space as viewed from the longitudinal direction said bracket;
wherein said pin member passes through said space and is connected to said pin-receiving portion at plural positions;
said pin-receiving portion including:
   a main plate disposed at a side of said core portion; and
   a sub plate connected to said main plate; and
   said pin member is connected to both of said main plate and said sub plate;
   wherein one of said main plate and said sub plate has a staked portion for fixing the other of said main plate and said sub plate thereto by staking.

6. A heat exchanger according to claim 5, wherein,
each of said main plate and said sub plate has side wall portions and a bottom portion;
at least two staked portions being formed on each of said side wall portions of said main plate, and
said sub plate is fixed to said main plate by staking one of said staked portions per each of said side wall portions.

7. A motor vehicle according to claim 1, wherein said pin-receiving portion has a connection portion for supporting and connecting a blower for drawing air toward said core portion.

8. A motor vehicle according to claim 1, wherein,
said fluid passing through said tubes is cooling water for cooling an engine, and further comprising:
   a condenser for cooling refrigerant circulating in a refrigeration cycle, said condenser being disposed at an air upstream side of said core portion while being integrated with said core portion.

9. A heat exchanger for a vehicle, comprising:
a core portion having a plurality of tubes through which a fluid passes;
a bracket disposed at an end of said core portion;
a pin member mounting said heat exchanger on said vehicle, said pin member being disposed in said bracket while protruding in a direction crossing a longitudinal direction of said bracket; and
a pin receiving portion formed in said bracket, for receiving said pin member therein, said pin receiving portion forming a closed cross sectional space as viewed from the longitudinal direction of said bracket;
wherein said pin member passes through said space and connected to said pin-receiving portion at plural positions;
said pin-receiving portion including:
   a main plate disposed at a side of said core portion; and
   a sub plate connected to said main plate; and
   said pin member is connected to both of said main plate and said sub pate;
   wherein said pin member and both of said main plate and said sub plate are brazed to each other.

10. A heat exchanger comprising:
a first core portion having a plurality of first tubes through which a first medium flows;
a pair of first tank portions disposed respectively at both ends of said first tubes, for distributing and receiving the first medium;
a second core portion having a plurality of second tubes parallel to said first tubes and spaced from said first tubes by a predetermined gap, said second tubes having a second medium flowing therethrough;
a pair of second tank portions disposed respectively at both ends of said second tubes, for distributing and receiving the second medium;
a connection portion for connecting a part of said first core portion and a part of said second core portion; wherein,
said second tank portion has a step portion at a portion facing said first tank portion, said step portion being depressed in a direction opposite to said first tank portion, and
said first tank portion has a first adjacent portion which is closest to said second tank portion, said first adjacent portion being disposed at a position adjacent said step portion;

a bracket disposed at an end of said first core portion;

a pin member for mounting said heat exchanger on said vehicle, said pin member being disposed in said bracket while protruding in a direction crossing a longitudinal direction of said bracket; and a pin-receiving portion formed in said bracket, for receiving said pin member therein, said pin-receiving portion forming a closed cross-sectional space as viewed from the longitudinal direction of said bracket;

wherein said pin member passes through said space and is connected to said pin-receiving portion at plural positions.

11. A heat exchanger according to claim 10, wherein, said pin-receiving portion includes:
   a main plate disposed at a side of said core portion; and
   a sub plate connected to said main plate; and
   said pin member is connected to both of said main plate and said sub plate.

12. A heat exchanger according to claim 11, wherein, each of said main plate and said sub plate has side wall portions and a bottom portion, for forming a U-shape, said closed space is formed by said U-shaped plates, and said pin member is connected to said bottom portions.

13. A heat exchanger according to claim 12, wherein, said pin member has an outer wall surface parallel to an axial direction of said pin member, said pin member having a main protrusion portion protruding from said outer wall surface in a direction crossing the axial direction of said pin member and contacting said main plate, said pin member further having a sub protrusion portion contacting said sub plate, and both of said main protrusion portion and said sub protrusion portion are disposed inside said space.

14. A heat exchanger according to claim 11, wherein one of said main plate and said sub plate has a staked portion for fixing the other of said main plate and said sub plate thereto by staking.

15. A heat exchanger according to claim 14, wherein,
   each of said main plate and said sub plate has side wall portions and a bottom portion;
   at least two staked portions being formed on each of said side wall portions of said main plate, and
   said sub plate is fixed to said main plate by staking one of said staked portions per each of said side wall portions.

16. A heat exchanger according to claim 10, wherein,
   said second tank portion has a second adjacent portion which is closest to said first tank portion, and
   said first adjacent portion is disposed at a side of said second tank portion opposite from said second adjacent portion.

17. A heat exchanger according to claim 10, wherein,
   said second tank portion includes:
      a second tank core plate connected to said second tubes; and
      a second tank body portion connected to said second tank core plate, and
      said step portion is formed at a connection portion between said second tank core plate and said second tank body.

18. A heat exchanger according to claim 10, wherein,
   said first tank portion includes:
      a first tank core plate connected to said first tubes;
      a first tank body portion connected to said first tank body portion, and
      said first tank core plate has a wall surface at a side of said first core portion, said wall surface being positioned at a side of said first core portion adjacent to said step portion.

19. A heat exchanger according to claim 10, further comprising:
   a first cooling fin disposed between said first tubes; and
   a second cooling fin disposed between said second tubes;
   wherein said connection portion is formed between said first and second cooling fins.

20. A heat exchanger according to claim 9, wherein, each of said main plate and said sub plate has side wall portions and a bottom portion, for forming a U-shape;
   said closed space is formed by said U-shaped plates; and
   said pin member is connected to said bottom portions.

21. A heat exchanger according to claim 20, wherein:
   said pin member has an outer wall surface parallel to an axial direction of said pin member, said pin member having a main protrusion portion protruding from said outer wall surface in a direction crossing the axial direction of said pin member and contacting said main plate, said pin member further having a sub protrusion portion contacting said sub plate; and
   both of said main protrusion portion and said sub protrusion portion are disposed inside said space.

22. A heat exchanger according to claim 9, wherein said pin-receiving portion has a connection portion for supporting and connecting a blower for drawing air toward said core portion.

23. A heat exchanger according to claim 9, wherein,
   said fluid passing through said tubes is cooling water for cooling an engine, and further comprising:
      a condenser for cooling refrigerant circulating in a refrigeration cycle, said condenser being disposed at an air upstream side of said core portion while being integrated with said core portion.

* * * * *